United States Patent
Yang et al.

(10) Patent No.: US 11,435,640 B1
(45) Date of Patent: Sep. 6, 2022

(54) CHOLESTERIC LIQUID CRYSTAL DISPLAY

(71) Applicant: Au Optronics Corporation, Hsinchu (TW)

(72) Inventors: Hao-Shiun Yang, Hsinchu (TW); Jian-Fu Chen, Hsinchu (TW); Chien-Chi Chen, Hsinchu (TW); Shang-Chiang Lin, Hsinchu (TW)

(73) Assignee: AU Optronics Corporation, Hsinchu (TW)

( * ) Notice: Subject to any disclaimer, the term of this patent is extended or adjusted under 35 U.S.C. 154(b) by 0 days.

(21) Appl. No.: 17/486,938

(22) Filed: Sep. 28, 2021

(30) Foreign Application Priority Data

May 21, 2021 (TW) .................. 110118435

(51) Int. Cl.
*G02F 1/137* (2006.01)
*G02F 1/1335* (2006.01)
*G02F 1/13363* (2006.01)

(52) U.S. Cl.
CPC .... *G02F 1/13718* (2013.01); *G02F 1/133514* (2013.01); *G02F 1/133531* (2021.01); *G02F 1/133536* (2013.01); *G02F 1/133638* (2021.01)

(58) Field of Classification Search
CPC ........... G02F 1/13718; G02F 1/133531; G02F 1/133638; G02F 1/133514; G02F 1/133536

USPC .......................................................... 349/56
See application file for complete search history.

(56) References Cited

U.S. PATENT DOCUMENTS

| 7,068,344 | B2 | 6/2006 | Pokorny et al. |
| 10,247,981 | B2 | 4/2019 | Lee et al. |
| 2004/0165140 | A1 | 8/2004 | Pokorny et al. |

FOREIGN PATENT DOCUMENTS

| JP | 2004145097 A | * | 5/2004 |
| TW | 200422716 | | 11/2004 |
| TW | I443415 | | 7/2014 |
| TW | 201903490 | | 1/2019 |

* cited by examiner

*Primary Examiner* — Nathanael R Briggs
*Assistant Examiner* — William D Peterson
(74) *Attorney, Agent, or Firm* — JCIPRNET

(57) ABSTRACT

A cholesteric liquid crystal display includes a cholesteric liquid crystal device, a color filter element, a first quarter-wave plate, and a light recovery structure. The cholesteric liquid crystal device includes a cholesteric liquid crystal. The color filter element and the first quarter-wave plate overlap the cholesteric liquid crystal device. The first quarter-wave plate and the color filter element are located between the cholesteric liquid crystal and the light recovery structure.

22 Claims, 9 Drawing Sheets

CHOLESTERIC LIQUID CRYSTAL DISPLAY

CROSS-REFERENCE TO RELATED APPLICATION

This application claims the priority benefit of Taiwanese application serial no. 110118435, filed on May 21, 2021. The entirety of the above-mentioned patent application is hereby incorporated by reference herein and made a part of this specification.

BACKGROUND

Technical Field

The disclosure relates to a cholesteric liquid crystal display, and in particular to a cholesteric liquid crystal display including a cholesteric liquid crystal device and a color filter element.

Description of Related Art

Cholesterol liquid crystal display is a non-self-emitting display, which mainly uses external ambient light as the light source to display the screen. Since the cholesterol liquid crystal display does not require a backlight module unit, and the cholesterol liquid crystal display is bistable, cholesterol liquid crystal display technology also has the advantage of power saving.

Generally speaking, after the stray light passes through the cholesterol liquid crystal (CLC), the circularly polarized light in one rotation direction will be reflected by the cholesterol liquid crystal, and the circularly polarized light in the other rotation direction will pass through the cholesterol liquid crystal. In this case, the cholesterol liquid crystal display may actually use only the circularly polarized light reflected by the cholesterol liquid crystal, resulting in the lack of brightness of the cholesterol liquid crystal display.

SUMMARY

The disclosure provides a cholesterol liquid crystal display capable of improving a problem of insufficient brightness of cholesterol liquid crystal display.

At least one embodiment of the disclosure provides a cholesteric liquid crystal display. The cholesteric liquid crystal display includes a cholesteric liquid crystal device, a color filter element, a first quarter-wave plate, and a light recovery structure. The cholesteric liquid crystal device includes a cholesteric liquid crystal. The color filter element and the first quarter-wave plate overlap the cholesteric liquid crystal device. The first quarter-wave plate and the color filter element are located between the cholesteric liquid crystal and the light recovery structure.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1A:
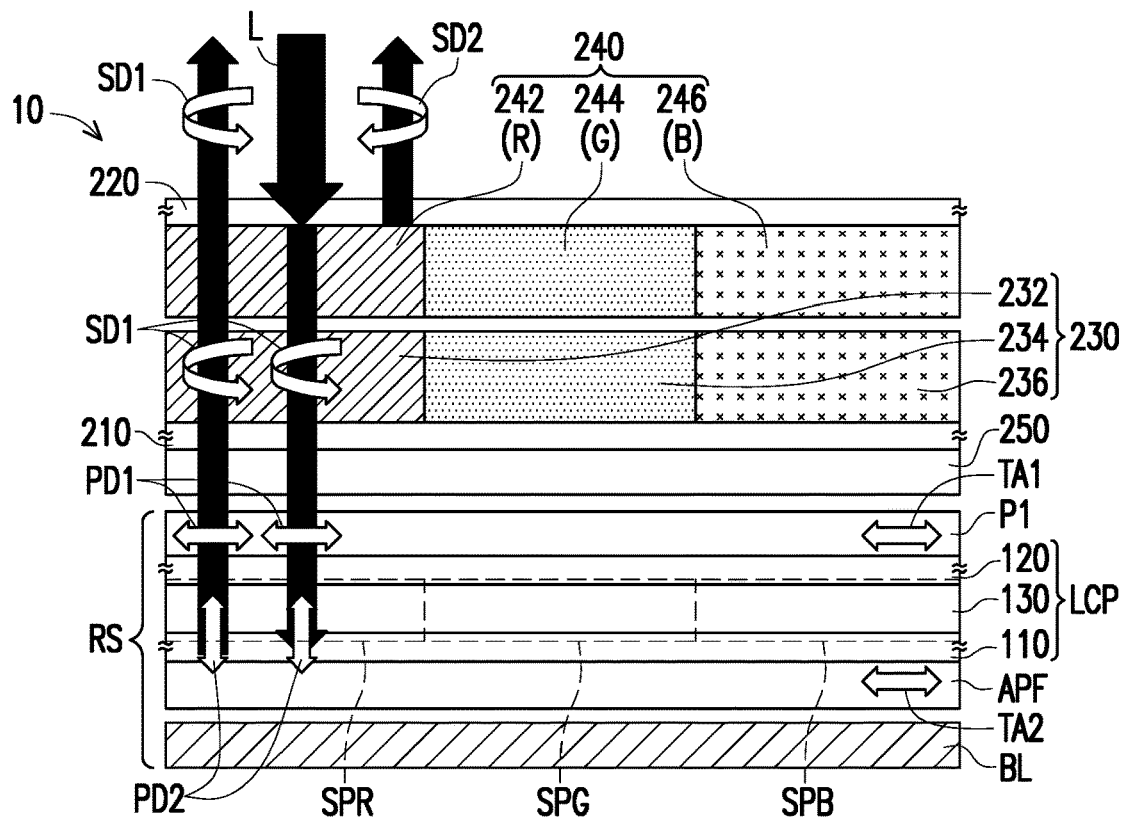
FIG. 1A is a schematic cross-sectional view of a cholesteric liquid crystal display in a display mode according to an embodiment of the disclosure.
Figure 1B:
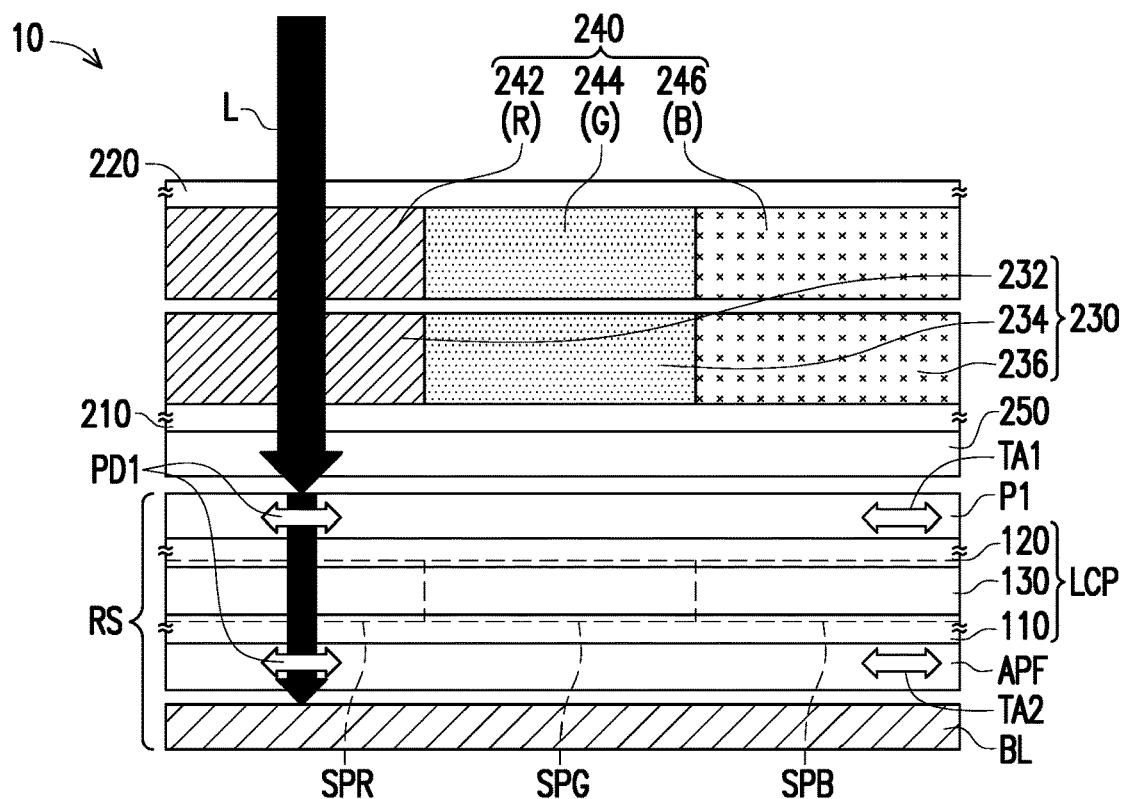
FIG. 1B is a schematic cross-sectional view of a cholesteric liquid crystal display in an off mode according to an embodiment of the disclosure.

FIG. 1A is a schematic cross-sectional view of a cholesteric liquid crystal display in a display mode according to an embodiment of the disclosure. FIG. 1B is a schematic cross-sectional view of a cholesteric liquid crystal display in an off mode according to an embodiment of the disclosure.

Referring FIG. 1A, a cholesteric liquid crystal display 10 includes a cholesteric liquid crystal device 240, a color filter element 230, a first quarter-wave plate 250, and a light recovery structure RS. In this embodiment, the cholesteric liquid crystal display 10 further includes a first substrate 210 and a second substrate 220. The color filter element 230 and the cholesteric liquid crystal device 240 are located between the first substrate 210 and the second substrate 220.

The first substrate 210 and the second substrate 220 are transparent substrates, and materials include glass, quartz, organic polymers or other applicable materials.

The cholesteric liquid crystal device 240 includes multiple first sub-pixels R, G, and B. FIG. 1A shows multiple cholesteric liquid crystals 242, 244, and 246 in the first sub-pixels R, G, and B, and control electrodes and common electrodes in the first sub-pixels R, G, and B are omitted.

Figure 1C:
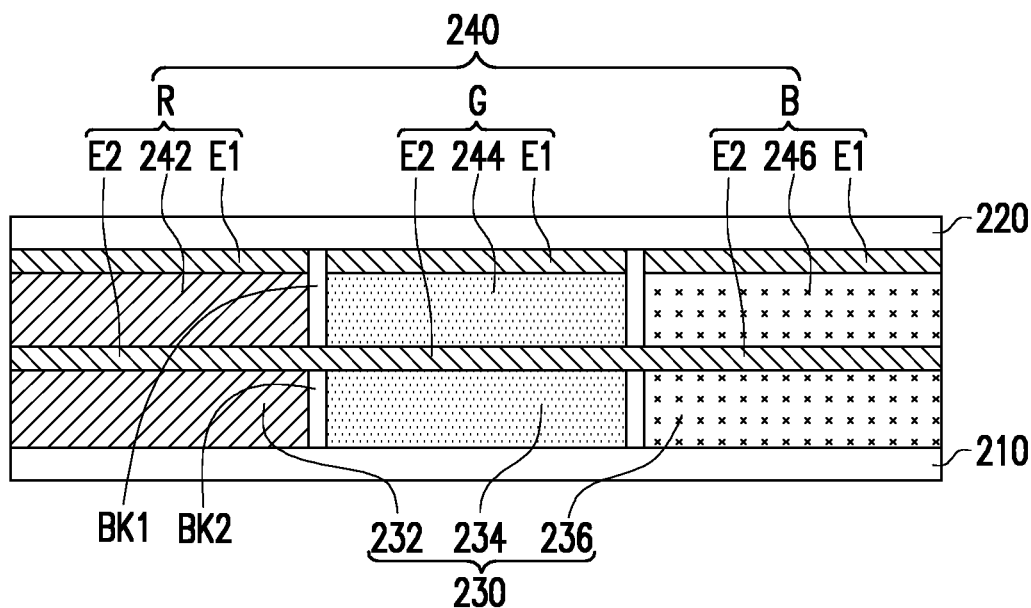
FIG. 1C is a schematic cross-sectional view of a cholesteric liquid crystal device according to an embodiment of the disclosure.

In some embodiments, each of the first sub-pixels R, G, and B each has a corresponding control electrode, and the common electrodes of the first sub-pixels R, G, and B are electrically connected to each other, as shown in FIG. 1C.

In this embodiment, the first sub-pixel R is a red sub-pixel, and the cholesteric liquid crystal 242 is a red cholesteric liquid crystal. The first sub-pixel G is a green sub-pixel, and the cholesteric liquid crystal 244 is a green cholesteric liquid crystal. The first sub-pixel B is a blue sub-pixel, and the cholesteric liquid crystal 246 is a blue cholesteric liquid crystal.

The color filter element 230 overlaps the cholesteric liquid crystal device 240. The color filter element 230 includes a red filter element 232, a green filter element 234, and a blue filter element 236. In this embodiment, the red filter element 232 overlaps the red sub-pixel (the first sub-pixel R). The green filter element 234 overlaps the green sub-pixel (the first sub-pixel G), and the blue filter element 236 overlaps the blue sub-pixel (the first sub-pixel B).

In some embodiments, a transmission spectrum of the red filter element 232 and a reflection spectrum of the cholesteric liquid crystal 242 of the first sub-pixel R have more than 60% of the area overlapping each other. A transmission spectrum of the green filter element 234 and a reflection spectrum of the cholesteric liquid crystal 244 of the first sub-pixel G have more than 60% of the area overlapping each other. A transmission spectrum of the blue filter element 236 and a reflection spectrum of the cholesteric liquid crystal 246 of the first sub-pixel B have more than 60% of the area overlapping each other.

The first quarter-wave plate 250 overlaps the cholesteric liquid crystal device 240. In this embodiment, the first quarter-wave plate 250 is located between the color filter element 230 and the light recovery structure RS, and the color filter element 230 and the first quarter-wave plate 250 are respectively located at opposite sides of the first substrate 210, but the disclosure is not limited thereto. In other embodiments, the color filter element 230 and the first quarter-wave plate 250 are located at a same side of the first substrate 210. For example, the first quarter-wave plate 250 is formed on the first substrate 210 first, and then the color filter element 230 is formed on the first quarter-wave plate 250. In other embodiments, positions of the color filter element 230 and the first quarter-wave plate 250 may be exchanged. In other words, in other embodiments, the first quarter-wave plate 250 is located between the color filter element 230 and the cholesteric liquid crystals 242, 244, and 246.

In this embodiment, the light recovery structure RS includes a liquid crystal panel LCP, a first polarizer P1, a reflective polarizer APF, and a light-absorbing substrate BL.

The first polarizer P1 is located between the liquid crystal panel LCP and the first quarter-wave plate 250. In this embodiment, the first polarizer P1 has a first transmission axis TA1. In other words, light in a polarization direction parallel to the first transmission axis TA1 may pass through the first polarizer P1.

The liquid crystal panel LCP includes multiple second sub-pixels SPR, SPG, and SPB. The second sub-pixels SPR, SPG, and SPB respectively overlap a corresponding one of the first sub-pixels R, G, and B. FIG. 1A shows a third substrate 110, a fourth substrate 120, and a liquid crystal layer 130 in the liquid crystal panel LCP, and pixel electrodes and common electrodes in the liquid crystal panel LCP are omitted. In some embodiments, each of the second sub-pixels SPR, SPG, and SPB has a corresponding pixel electrode, and common electrodes of the second sub-pixels SPR, SPG, and SPB are electrically connected to each other.

The liquid crystal layer 130, the pixel electrodes, and the common electrodes are located between the third substrate 110 and the fourth substrate 120. In this embodiment, the liquid crystal layer 130 is nematic liquid crystal, smectic liquid crystal or other non-cholesterol liquid crystal.

The light-absorbing substrate BL overlaps the liquid crystal panel LCP. The reflective polarizer APF is located between the light-absorbing substrate BL and the liquid crystal panel LCP. In this embodiment, optical density (OD) of the light-absorbing substrate BL is greater than or equal to 0.5. In this embodiment, the reflective polarizer APF has a second transmission axis TA2. In other words, light in a polarization direction parallel to the second transmission axis TA2 may pass through the reflective polarizer APF, and light in a polarization direction perpendicular to the second transmission axis TA2 may be reflected by the reflective polarizer APF. In this embodiment, the first transmission axis TA1 of the first polarizer P1 is substantially parallel to the second transmission axis TA2 of the reflective polarizer APF.

Referring FIG. 1A and FIG. 1B at the same time, in this embodiment, the cholesteric liquid crystal device 240 is configured to allow circularly polarized light or elliptical polarized light in a first rotation direction SD1 in a stray light L to pass, and to allow circularly polarized light or elliptical polarized light in a second rotation direction SD2 in the stray light L to be reflected. For example, liquid crystal molecules in the cholesteric liquid crystals 242, 244, and 246 change their arrangement (e.g., planar state, focal conic state, and homeotropic state) due to electric field between the control electrodes and the common electrodes, thereby converting the stray light to circularly polarized light or elliptical polarized light. In some embodiments, the cholesteric liquid crystals 242, 244, and 246 are bistable, and the liquid crystal molecules in the cholesteric liquid crystals 242, 244, and 246 may be maintained in planar state and focal cone state without continuously applying voltage to the liquid crystal molecules in the cholesteric liquid crystals 242, 244, and 246. However, the liquid crystal molecules in the cholesteric liquid crystals 242, 244, and 246 require continuous voltage application to maintain the liquid crystal molecules in the cholesteric liquid crystals 242, 244, and 246 in homeotropic state, but the disclosure is not limited thereto. In this embodiment, the first sub-pixel R is defined to convert the stray light L into circularly polarized light or elliptical polarized light in a first state, as shown in an optical path corresponding to the first sub-picture R in FIG. 1A, and the cholesteric liquid crystal in the first state is, for example, in planar state. The first sub-pixel R may not change the polarization direction of light in a second state, as shown in an optical path corresponding to the first sub-picture R in FIG. 1B, and the cholesteric liquid crystal in the second state is, for example, in focal conic state or homeotropic state. Although FIG. 1A and FIG. 1B only show the optical path of the first sub-pixel R, it should be noted that the first sub-pixels R, G, and B all have similar optical paths when in the first state, and the first sub-pixels R, G and B all have similar optical paths when in the second state. In some embodiments, each of the first sub-pixels R, G, and B may be independently switched between the first state and the second state. In other words, when red is required to be displayed, the first sub-pixel R is enabled to be in the first state and the first sub-pixels G and B are enabled to be in the second state. When green is required to be displayed, the first sub-pixel G is enabled to be in the first state and the first sub-pixels R and B are enabled to be in the second state. When blue is required to be displayed, the first sub-pixel B is enabled to be in the first state and the first sub-pixels R and G are enabled to be in the second state.

In this embodiment, the liquid crystal panel LCP is configured to change a polarization direction of linear polarized light. For example, the liquid crystal molecules in the liquid crystal layer 130 are rotated due to the electric field between the pixel electrodes and the common electrodes, thereby changing the polarization direction of the light. The liquid crystal layer 130 is suitable for generating light with phase retardation of integer multiples of 1/2λ or 1/4λ, where λ is wavelength of the light. In this embodiment, the second sub-pixel SPR is defined to be able to change the polarization direction of light when in an ON state, as shown in an optical path corresponding to the second sub-pixel SPR in FIG. 1A; the second sub-pixel SPR may not change the polarization direction of light when in an OFF state, as shown in an optical path corresponding to the second sub-pixel SPR in FIG. 1B. In some embodiments, the second sub-pixel SPR is in the ON state when receiving voltage, and is in the OFF state when not receiving voltage, but the disclosure is not limited thereto. In other embodiments, the second sub-pixel SPR is in the ON state when not receiving voltage, and is in the OFF state when receiving voltage. Although FIG. 1A and FIG. 1B only show the optical path of the second sub-pixel SPR, it should be noted that the second sub-pixels SPR, SPG, and SPB all have similar optical paths when in the ON state, and the second sub-pixels SPR, SPG, and SPB all have similar optical paths when in the OFF state. In some embodiments, each of the second sub-pixels SPR, SPG, and SPB may be independently switched on and off. In other words, when red is required to be displayed, the second sub-pixel SPR is turned on and the second sub-pixels SPG and SPB are turned off. When green is required to be displayed, the second sub-pixel SPG is turned on and the second sub-pixels SPR and SPB are turned off. When blue is required to be displayed, the second sub-pixel SPB is turned on and the second sub-pixels SPR and SPG are turned off.

Referring FIG. 1A, when red is required to be displayed, the first sub-pixel R is enabled to switch to the first state and the second sub-pixel SPR is enabled to switch to the ON state simultaneously, and when the stray light L (e.g. sunlight) from the external environment reaches the first sub-pixel R, the circularly polarized light or the elliptical polarized light in the first rotation direction SD1 is allowed to pass through, while the circularly polarized light or the elliptical polarized light in the second rotation direction SD2 is reflected. The circularly polarized light or the elliptical polarized light in the first rotation direction SD1 is converted by the first quarter-wave plate 250 into linear polarized light in a first polarization direction PD1 after passing through the color filter 230 and the first substrate 210. The first polarization direction PD1 is substantially parallel to the first transmission axis TA1 of the first polarizer P1, so that the linear polarized light in the first polarization direction PD1 may pass through the first polarizer P1. In this embodiment, the second sub-pixel SPR causes phase retardation of 1/2λ for the linear polarized light in the first polarization direction PD1, where λ is wavelength of the light. In some embodiments, λ is 380 nm to 780 nm, such as 550 nm.

The linear polarized light in the first polarization direction PD1 is converted by the second sub-pixel SPR into linear polarized light in a second polarization direction PD2. The second polarization direction PD2 is substantially perpendicular to the second transmission axis TA2 of the reflective polarizer APF, so that the linear polarized light in the second polarization direction PD2 will be reflected by the reflective polarizer APF and re-enter the second sub-pixel SPR. The linear polarized light in the second polarization direction PD2 is re-converted by the second sub-pixel SPR into the linear polarized light in the first polarization direction PD1, and then passes through the first polarizer P1. The linear polarized light in the first polarization direction PD1 passing through the first polarizer P1 is converted by the first quarter-wave plate 250 into the circularly polarized light or the elliptical polarized light in the first rotation direction SD1. The circularly polarized light or the elliptical polarized light in the first rotation direction SD1 may pass through the first sub-pixel R and be transmitted to the outside world.

Based on the above, the light recovery structure RS may effectively enhance the brightness of the cholesteric liquid crystal display 10.

Referring FIG. 1B, when red is not required to be displayed, the first sub-pixel R is enabled to switch to the second state and the second sub-pixel SPR is enabled to switch to the Off state simultaneously, and the stray light L of the external environment passes through the first sub-pixel R, the color filter element 230, the first substrate 210, and the first quarter-wave plate 250 before being converted by the first polarizer P1 into the linear polarized light in the first polarization direction PD1. The linear polarized light in the first polarization direction PD1 passes through the second sub-pixel SPR and the reflective polarizer APF, and is absorbed by the light-absorbing substrate BL.

In addition, when green is required to be displayed, the first sub-pixel G is enabled to switch to the first state and the second sub-pixel SPG is enabled to switch to the ON state simultaneously. When blue is required to be displayed, the first sub-pixel B is enabled to switch to the first state and the second sub-pixel SPB is enabled to switch to the ON state simultaneously. When green is not required to be displayed, the first sub-pixel G is enabled to switch to the second state and the second sub-pixel SPG is enabled to switch to the OFF state simultaneously. When blue is not required to be displayed, the first sub-pixel B is enabled to switch to the second state and the second sub-pixel SPB is enabled to switch to the OFF state simultaneously.

In summary, the light recovery structure RS may improve the lack of contrast of the cholesterol liquid crystal display 10.

FIG. 1C is a schematic cross-sectional view of a cholesteric liquid crystal device according to an embodiment of the disclosure. For example, FIG. 1C is a schematic cross-sectional view of the cholesteric liquid crystal device of FIG. 1A.

Referring FIG. 1C, each of the first sub-pixels includes a control electrode, a cholesteric liquid crystal and a common electrode, in which the common electrodes of the first sub-pixels are electrically connected to each other.

In this embodiment, the first sub-pixel R includes a control electrode E1, a cholesteric liquid crystal 242, and a common electrode E2; the first sub-pixel G includes a control electrode E1, a cholesteric liquid crystal 244, and a common electrode E2; and the first sub-pixel B includes a control electrode E1 and a cholesteric liquid crystal 246. The control electrodes E of the first sub-pixels R, G, and B are separated from each other, and the common electrodes E2 of the first sub-pixels R, G, and B are electrically connected to each other. The cholesteric liquid crystals 242, 244, and 246 are located between the control electrodes E1 and the common electrodes E2. The control electrodes E1 are located between the second substrate 220 and the cholesteric liquid crystals 242, 244, and 246. The common electrodes E2 are located between the color filter element 230 and the cholesteric liquid crystals 242, 244, and 246.

In this embodiment, there is a blocking wall BK1 between the cholesteric liquid crystals 242, 244, and 246, and the blocking wall BK1 separates the cholesteric liquid crystals 242, 244, and 246 from each other. In this embodiment, the red filter element 232, the green filter element 234, and the blue filter element 236 optionally have a blocking wall BK2 between them. The blocking wall BK1 and/or the blocking wall BK2 optionally include a light-shielding material (e.g. black matrix) so as to avoid mixing of different colors of light.

In some embodiments, multiple active elements (not shown) are also located between the first substrate 210 and the second substrate 220, and the active elements are configured to control voltage of the control electrodes E1 and/or the common electrodes E2.

Figure 1D:
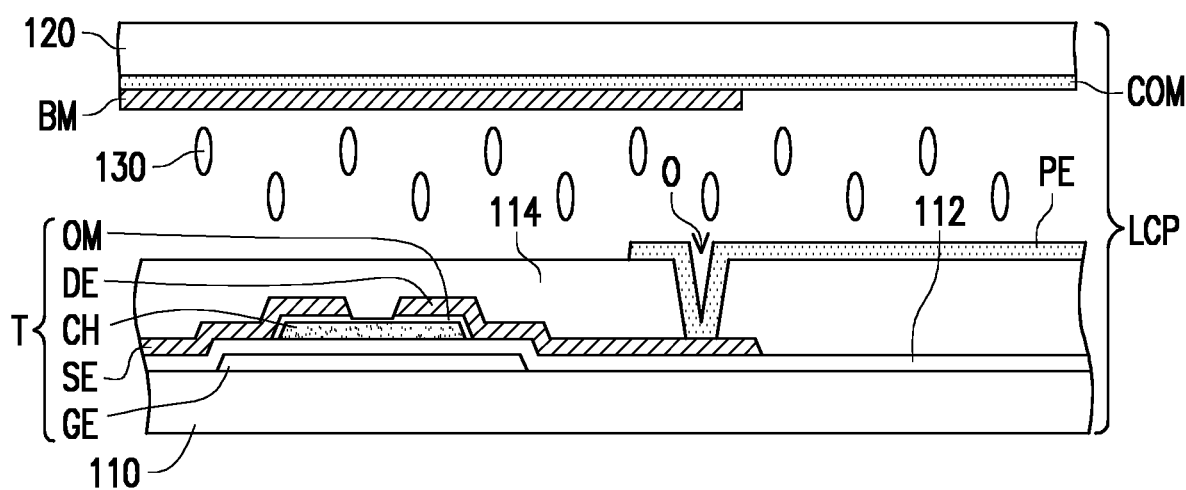
FIG. 1D is a schematic cross-sectional view of a liquid crystal panel according to an embodiment of the disclosure.

FIG. 1D is a schematic cross-sectional view of a liquid crystal panel according to an embodiment of the disclosure. For example, FIG. 1D is a schematic cross-sectional view of one of the second sub-pixels SPR, SPG, and SPB in the liquid crystal panel LCP of FIG. 1A.

Referring FIG. 1D, in this embodiment, the liquid crystal panel LCP includes the third substrate 110, the fourth substrate 120, the liquid crystal layer 130, multiple active elements T, multiple pixel electrodes PE, and a common electrode COM. The liquid crystal layer 130, the active elements T, the pixel electrodes PE, and the common electrode COM are located between the third substrate 110 and the fourth substrate 120.

In this embodiment, each of the second sub-pixels includes an active element T and a pixel electrode PE.

The active element T includes a channel layer CH, a gate electrode GE, a source electrode SE, and a drain electrode DE. The gate electrode GE is electrically connected to a corresponding scan line. The gate electrode GE overlaps the channel layer CH, and there is an insulating layer 112 between the gate electrode GE and the channel layer CH. The source electrode SE and the drain electrode DE are located on the insulating layer 112 and are electrically connected to the channel layer CH. In some embodiments, an ohmic contact layer OM is also included between the source electrode SE and the channel layer CH and between the drain electrode DE and the channel layer CH, but the disclosure is not limited thereto. The source electrode SE is electrically connected to a corresponding data line.

Although in this embodiment, the active element T is a thin film transistor of a bottom gate electrode type as an example, the disclosure is not limited thereto. In other embodiments, the active element T may also be a top gate electrode type or other types of thin film transistors. In some embodiments, a light-shielding structure (not shown) is disposed under the active element T to avoid light (e.g., light emitted from a backlight module unit) from reaching the channel layer CH and causing leakage problems.

An insulating layer 114 covers the active element T. The pixel electrode PE is located on the insulating layer 114 and is electrically connected to the drain electrode DE of the active element T through an opening O of the insulating layer 114. The liquid crystal layer 130 is located on the pixel electrode PE. The common electrode COM is located on the fourth substrate 120.

The liquid crystal panel LCP optionally includes black matrix BM. Black matrix BM covers the active element T and signal lines (e.g., scan line and data line) in the liquid crystal panel LCP.

In this embodiment, the liquid crystal panel LCP is a twisted nematic (TN) type display panel, but the disclosure is not limited thereto. In other embodiments, the liquid crystal panel LCP is a vertical alignment (VA) type display panel, a fringe field switching (FFS) type display panel, an in-plane switching (IPS) type display panel, or advanced hyper-viewing angle (AHVA) type display panel.

Figure 2A:
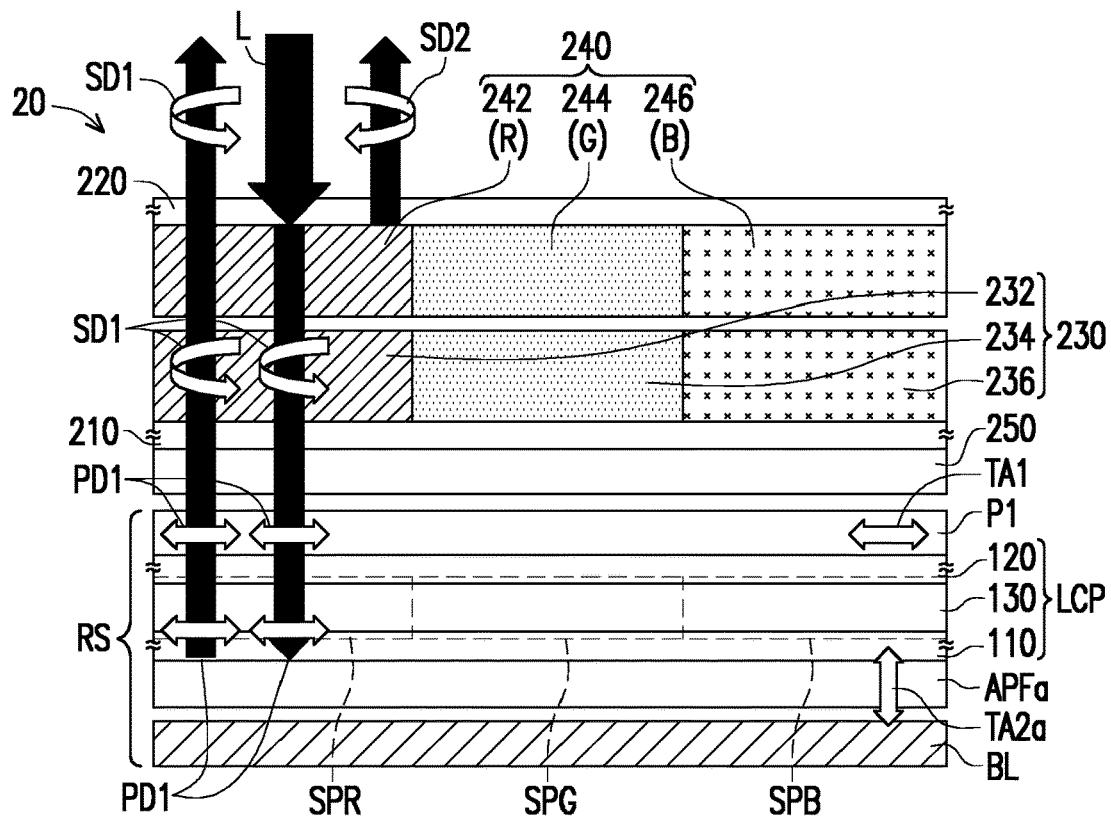
FIG. 2A is a schematic cross-sectional view of a cholesteric liquid crystal display in a display mode according to an embodiment of the disclosure.
Figure 2B:
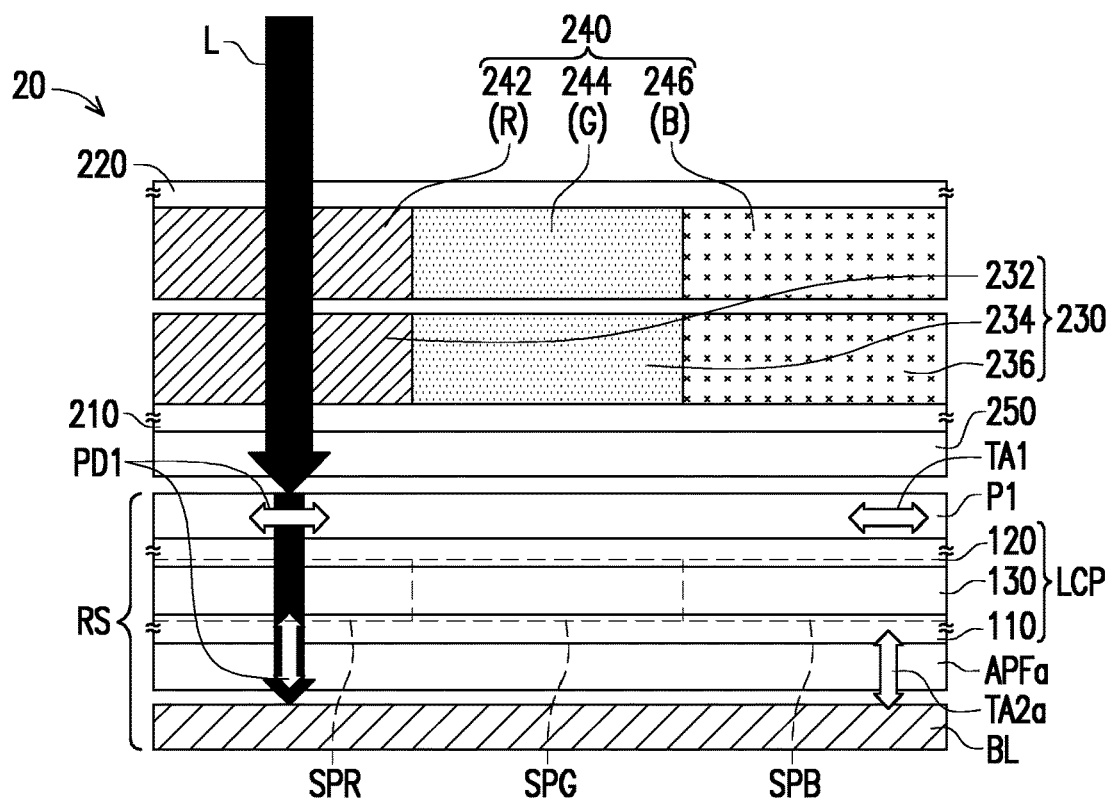
FIG. 2B is a schematic cross-sectional view of a cholesteric liquid crystal display in an off mode according to an embodiment of the disclosure.

FIG. 2A is a schematic cross-sectional view of a cholesteric liquid crystal display in a display mode according to an embodiment of the disclosure. FIG. 2B is a schematic cross-sectional view of a cholesteric liquid crystal display in an off mode according to an embodiment of the disclosure.

It should be noted that the embodiments of FIG. 2A and FIG. 2B follow the numeral references and parts of the embodiments of FIG. 1A and FIG. 1B, in which the same or similar numeral references are used to denote the same or similar elements, and the description of the same technical content is omitted. The description of the omitted parts can be found in the preceding embodiments and will not be repeated.

A cholesteric liquid crystal display 20 of FIG. 2A and FIG. 2B is similar to the cholesteric liquid crystal display 10 of FIG. 1A and FIG. 1B. The difference is that the second sub-pixels SPR, SPG, and SPB may not change the polarization direction of light when in the ON state; the second sub-pixels SPR, SPG and SPB may change the polarization direction of light when in the OFF state; in the cholesteric liquid crystal display 20, the first transmission axis TA1 of the first polarizer P1 is substantially perpendicular to a second transmission axis TA2$a$ of a reflective polarizer APFa.

Referring FIG. 2A and FIG. 2B, in this embodiment, the second sub-pixel SPR is defined not to be able to change the polarization direction of light when in the ON state, as shown in an optical path corresponding to the second sub-pixel SPR in FIG. 2A; the second sub-pixel SPR may change the polarization direction of light when in the OFF state, as shown in an optical path corresponding to the second sub-pixel SPR in FIG. 2B. In some embodiments, the second sub-pixel SPR is in the ON state when receiving voltage, and is in the OFF state when not receiving voltage, but the disclosure is not limited thereto. In other embodiments, the second sub-pixel SPR is in the ON state when not receiving voltage, and is in the OFF state when receiving voltage. Although FIG. 2A and FIG. 2B only show the optical path of the second sub-pixel SPR, it should be noted that the second sub-pixels SPR, SPG, and SPB all have similar optical paths when in the ON state, and the second sub-pixels SPR, SPG, and SPB all have similar optical paths when in the OFF state. In some embodiments, each of the second sub-pixels SPR, SPG, and SPB may be independently switched on and off. In other words, when red is required to be displayed, the second sub-pixel SPR is turned on and the second sub-pixels SPG and SPB are turned off. When green is required to be displayed, the second sub-pixel SPG is turned on and the second sub-pixels SPR and SPB are turned off. When blue is required to be displayed, the second sub-pixel SPB is turned on and the second sub-pixels SPR and SPG are turned off.

Referring FIG. 2A, when red is required to be displayed, the first sub-pixel R is enabled to switch to the first state and the second sub-pixel SPR is enabled to switch to the ON state simultaneously, and when the stray light L (e.g. sunlight) from the external environment reaches the first sub-pixel R, the circularly polarized light or the elliptical polarized light in the first rotation direction SD1 is allowed to pass through, while the circularly polarized light or the elliptical polarized light in the second rotation direction SD2 is reflected. The circularly polarized light or the elliptical polarized light in the first rotation direction SD1 is converted by the first quarter-wave plate 250 into the linear polarized light in the first polarization direction PD1 after passing through the color filter 230 and the first substrate 210. The first polarization direction PD1 is substantially parallel to the first transmission axis TA1 of the first polarizer P1, so that the linear polarized light in the first polarization direction PD1 may pass through the first polarizer P1. In this embodiment, the linear polarized light in the first polarization direction PD1 passes through the second sub-pixel SPR, and the first polarization direction PD1 is substantially perpendicular to the second transmission axis TA2a of the reflective polarizer APFa, so that the linear polarized light in the first polarization direction PD1 is reflected by the reflective polarizer APFa and pass through the second sub-pixel SPR and the first polarizer P1 again. The linear polarized light in the first polarization direction PD1 passing through the first polarizer P1 is converted by the first quarter-wave plate 250 into the circularly polarized light or the elliptical polarized light in the first rotation direction SD1. The circularly polarized light or the elliptical polarized light in the first rotation direction SD1 may pass through the first sub-pixel R and be transmitted to the outside world.

Based on the above, the light recovery structure RS may effectively enhance the brightness of the cholesteric liquid crystal display 20.

Referring FIG. 2B, when red is not required to be displayed, the first sub-pixel R is enabled to switch to the second state and the second sub-pixel SPR is enabled to switch to the Off state simultaneously, and the stray light L of the external environment passes through the first sub-pixel R, the color filter element 230, the first substrate 210, and the first quarter-wave plate 250 before being converted by the first polarizer P1 into the linear polarized light in the first polarization direction PD1. In this embodiment, the second sub-pixel SPR causes phase retardation of 1/2λ for the linear polarized light in the first polarization direction PD1, where λ is wavelength of the light, so that the linear polarized light in the first polarization direction PD1 is converted by the second sub-pixel SPR into the linear polarized light in the second polarization direction PD2. The second polarization direction PD2 is substantially parallel to the second transmission axis TA2a of the reflective polarizer APFa, so that the linear polarized light in the second polarization direction PD2 is allowed to pass through the reflective polarizer APFa and is absorbed by the light-absorbing substrate BL.

In addition, when green is required to be displayed, the first sub-pixel G is enabled to switch to the first state and the second sub-pixel SPG is enabled to switch to the ON state simultaneously. When blue is required to be displayed, the first sub-pixel B is enabled to switch to the first state and the second sub-pixel SPB is enabled to switch to the ON state simultaneously. When green is not required to be displayed, the first sub-pixel G is enabled to switch to the second state and the second sub-pixel SPG is enabled to switch to the OFF state simultaneously. When blue is not required to be displayed, the first sub-pixel B is enabled to switch to the second state and the second sub-pixel SPB is enabled to switch to the OFF state simultaneously.

In summary, the light recovery structure RS may improve the lack of contrast of the cholesterol liquid crystal display.

Figure 3A:
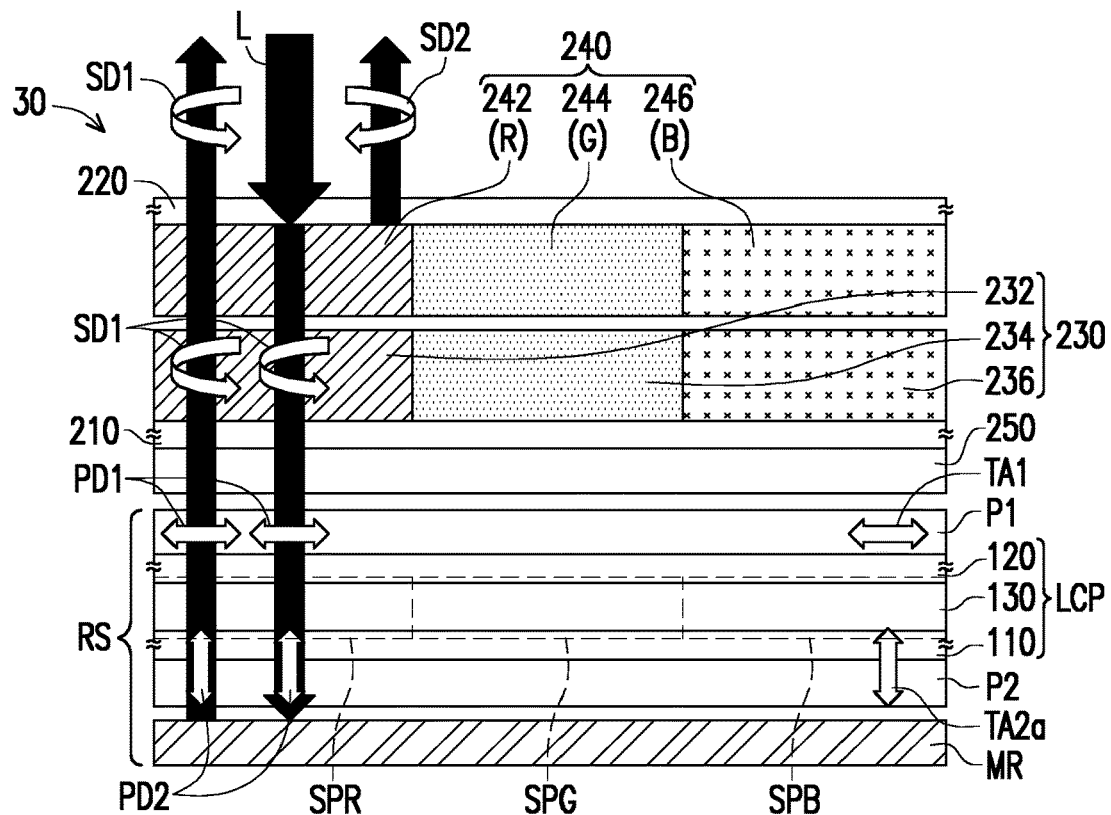
FIG. 3A is a schematic cross-sectional view of a cholesteric liquid crystal display in a display mode according to an embodiment of the disclosure.
Figure 3B:
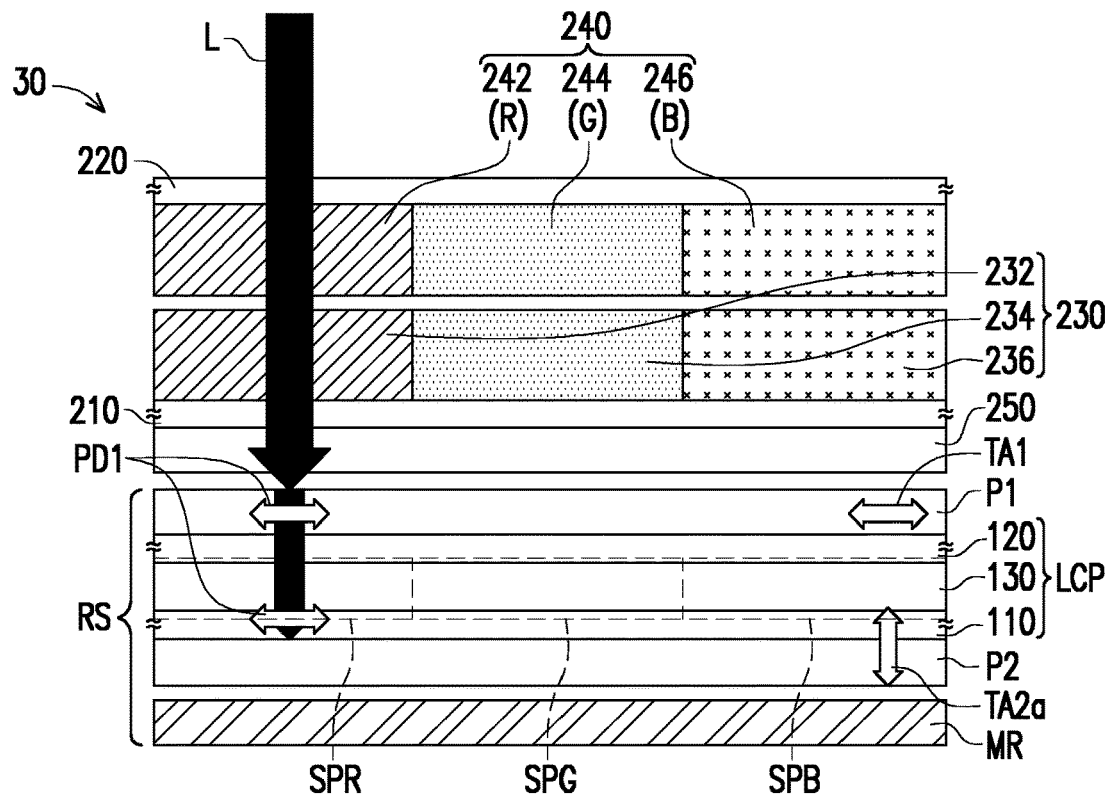
FIG. 3B is a schematic cross-sectional view of a cholesteric liquid crystal display in an off mode according to an embodiment of the disclosure.

FIG. 3A is a schematic cross-sectional view of a cholesteric liquid crystal display in a display mode according to an embodiment of the disclosure. FIG. 3B is a schematic cross-sectional view of a cholesteric liquid crystal display in an off mode according to an embodiment of the disclosure.

It should be noted that the embodiments of FIG. 3A and FIG. 3B follow the numeral references and parts of the embodiments of FIG. 1A and FIG. 1B, in which the same or similar numeral references are used to denote the same or similar elements, and the description of the same technical content is omitted. The description of the omitted parts can be found in the preceding embodiments and will not be repeated.

A cholesteric liquid crystal display 30 of FIG. 3A and FIG. 3B is similar to the cholesteric liquid crystal display 10 of FIG. 1A and FIG. 1B. The difference is that the light recovery structure RS of the cholesteric liquid crystal display 30 includes the first polarizer P1, the liquid crystal panel LCP, a second polarizer P2, and a mirror MR.

The first polarizer P1 is located between the liquid crystal panel LCP and the first quarter-wave plate 250. The mirror MR overlaps the liquid crystal panel LCP. The second polarizer P2 is located between the mirror MR and the liquid crystal panel LCP, and the transmission axis TA2a of the second polarizer P2 is substantially perpendicular to the transmission axis TA1 of the first polarizer P1.

Referring FIG. 3A and FIG. 3B, in this embodiment, the second sub-pixel SPR is defined to be able to change the polarization direction of light when in the ON state, as shown in an optical path corresponding to the second sub-pixel SPR in FIG. 3A; the second sub-pixel SPR may not change the polarization direction of light when in the OFF state, as shown in an optical path corresponding to the second sub-pixel SPR in FIG. 3B. In other embodiments, the second sub-pixel SPR is in the ON state when not receiving voltage, and is in the OFF state when receiving voltage. Although FIG. 3A and FIG. 3B only show the optical path of the second sub-pixel SPR, it should be noted that the second sub-pixels SPR, SPG, and SPB all have similar optical paths when in the ON state, and the second sub-pixels SPR, SPG, and SPB all have similar optical paths when in the OFF state. In some embodiments, each of the second sub-pixels SPR, SPG, and SPB may be independently switched on and off. In other words, when red is required to be displayed, the second sub-pixel SPR is turned on and the second sub-pixels SPG and SPB are turned off. When green is required to be displayed, the second sub-pixel SPG is turned on and the second sub-pixels SPR and SPB are turned off. When blue is required to be displayed, the second sub-pixel SPB is turned on and the second sub-pixels SPR and SPG are turned off.

Referring FIG. 3A. when red is required to be displayed, the first sub-pixel R is enabled to switch to the first state and the second sub-pixel SPR is enabled to switch to the ON state simultaneously, and when the stray light L (e.g. sunlight) from the external environment reaches the first sub-pixel R, the circularly polarized light or the elliptical polarized light in the first rotation direction SD1 is allowed to pass through, while the circularly polarized light or the elliptical polarized light in the second rotation direction SD2 is reflected. The circularly polarized light or the elliptical polarized light in the first rotation direction SD1 is converted by the first quarter-wave plate 250 into the linear polarized light in the first polarization direction PD1 after passing through the color filter 230 and the first substrate 210. The first polarization direction PD1 is substantially parallel to the first transmission axis TA1 of the first polarizer P1, so that the linear polarized light in the first polarization direction PD1 may pass through the first polarizer P1. In this embodiment, the second sub-pixel SPR causes phase retardation of 1/2λ for the linear polarized light in the first polarization direction PD1, where λ is wavelength of the light, so that the linear polarized light in the first polarization direction PD1 is converted by the second sub-pixel SPR into the linear polarized light in the second polarization direction PD2. The second polarization direction PD2 is substantially parallel to the second transmission axis TA2a of the second polarizer P2, so that the linear polarized light in the second polarization direction PD2 is allowed to pass through the second polarizer P2 and be reflected by the mirror MR. The linear polarized light in the second polarization direction PD2 reflected by the mirror MR passes through the second polarizer P2 again, and re-enters the second sub-pixel SPR. The linear polarized light in the second polarization direction PD2 is re-converted by the second sub-pixel SPR into the linear polarized light in the first polarization direction PD1, and then passes through the first polarizer P1. The linear polarized light in the first polarization direction PD1 passing through the first polarizer P1 is converted by the first quarter-wave plate 250 into the circularly polarized light or the elliptical polarized light in the first rotation direction SD1. The circularly polarized light or the elliptical polarized light in the first rotation direction SD1 may pass through the first sub-pixel R and be transmitted to the outside world.

Based on the above, the light recovery structure RS may effectively enhance the brightness of the cholesteric liquid crystal display 30.

Referring FIG. 3B, when red is not required to be displayed, the first sub-pixel R is enabled to switch to the second state and the second sub-pixel SPR is enabled to switch to the Off state simultaneously, and the stray light L of the external environment passes through the first sub-pixel R, the color filter element 230, the first substrate 210, and the first quarter-wave plate 250 before being converted by the first polarizer P1 into the linear polarized light in the first polarization direction PD1. The linear polarized light in the first polarization direction PD1 passes through the second sub-pixel SPR. Since the first polarization direction PD1 is substantially perpendicular to the transmission axis TA2a of the second polarizer P2, the linear polarized light in the first polarization direction PD1 may not pass through the second polarizer P2 and is absorbed by the second polarizer P2.

In addition, when green is required to be displayed, the first sub-pixel G is enabled to switch to the first state and the second sub-pixel SPG is enabled to switch to the ON state simultaneously. When blue is required to be displayed, the first sub-pixel B is enabled to switch to the first state and the second sub-pixel SPB is enabled to switch to the ON state simultaneously. When green is not required to be displayed, the first sub-pixel G is enabled to switch to the second state and the second sub-pixel SPG is enabled to switch to the OFF state simultaneously. When blue is not required to be displayed, the first sub-pixel B is enabled to switch to the second state and the second sub-pixel SPB is enabled to switch to the OFF state simultaneously.

In summary, the light recovery structure RS may improve the lack of contrast of the cholesterol liquid crystal display.

Figure 4A:
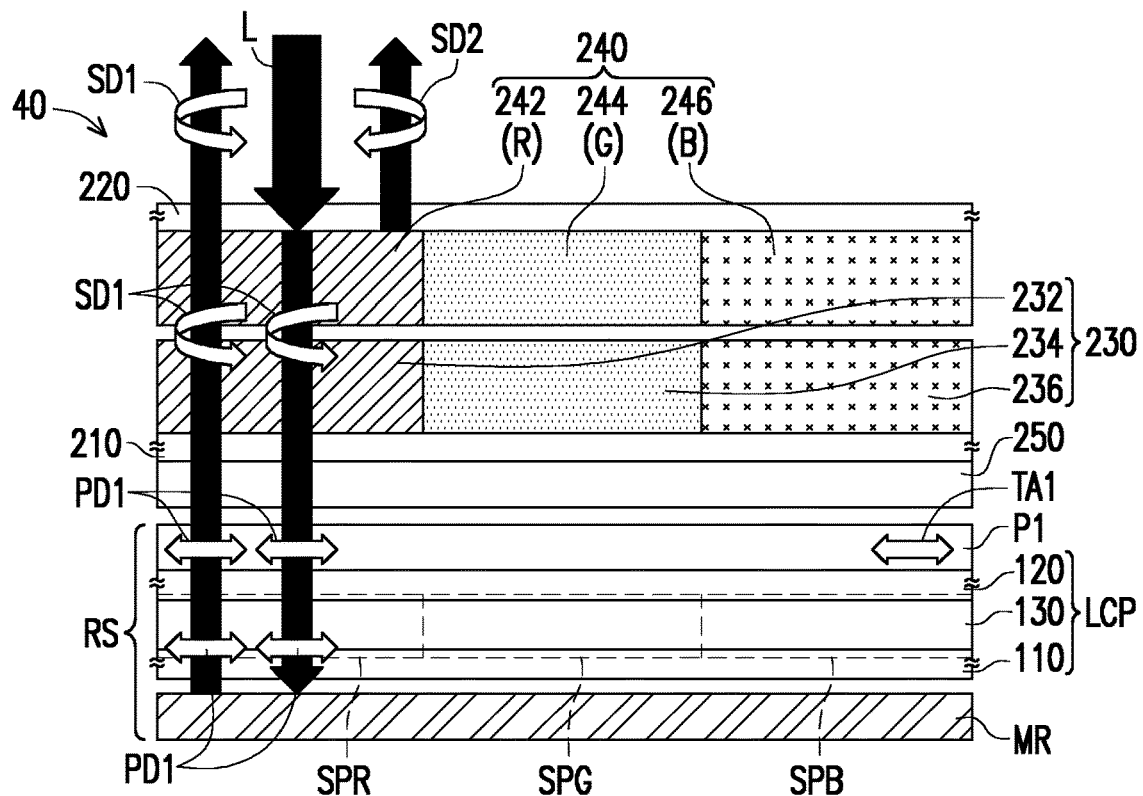
FIG. 4A is a schematic cross-sectional view of a cholesteric liquid crystal display in a display mode according to an embodiment of the disclosure.
Figure 4B:
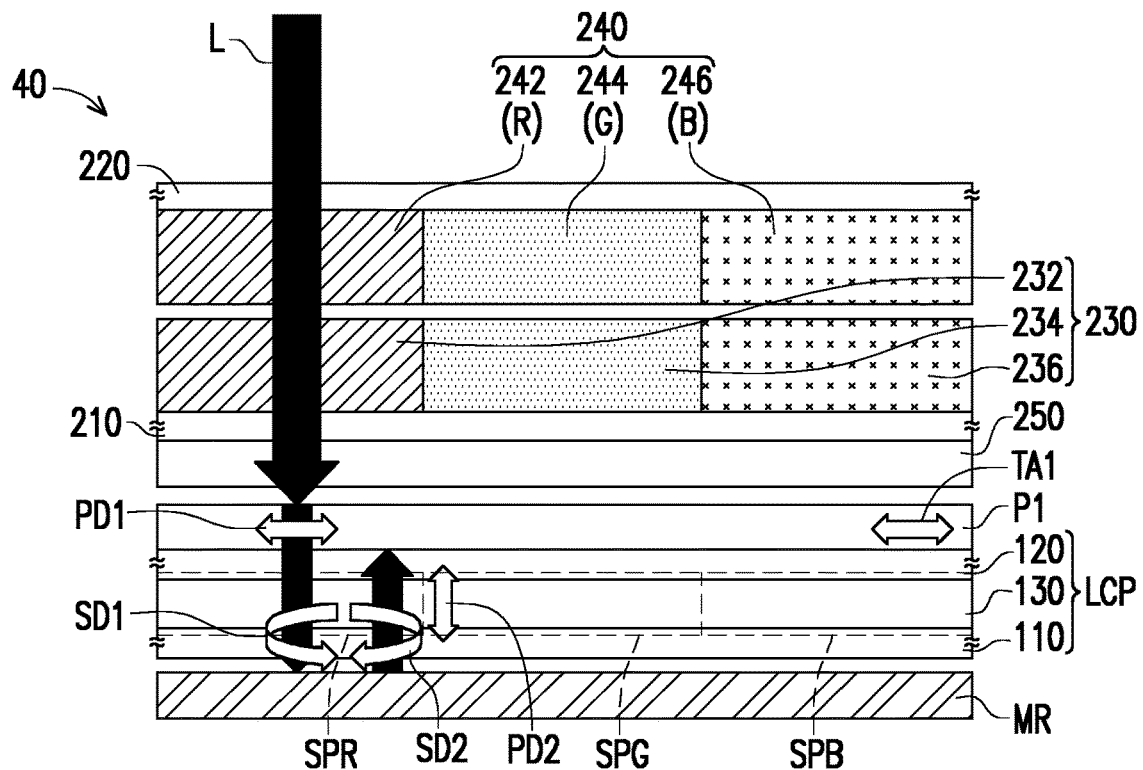
FIG. 4B is a schematic cross-sectional view of a cholesteric liquid crystal display in an off mode according to an embodiment of the disclosure.

FIG. 4A is a schematic cross-sectional view of a cholesteric liquid crystal display in display mode according to an embodiment of the disclosure. FIG. 4B is a schematic cross-sectional view of a cholesteric liquid crystal display in off mode according to an embodiment of the disclosure.

It should be noted that the embodiments of FIG. 4A and FIG. 4B follow the numeral references and parts of the embodiments of FIG. 2A and FIG. 2B, in which the same or similar numeral references are used to denote the same or similar elements, and the description of the same technical content is omitted. The description of the omitted parts can be found in the preceding embodiments and will not be repeated.

A cholesteric liquid crystal display 40 of FIG. 4A and FIG. 4B is similar to the cholesteric liquid crystal display 20 of FIG. 2A and FIG. 2B. The difference is that the light recovery structure RS of the cholesteric liquid crystal display 40 includes the first polarizer P1, the liquid crystal panel LCP, and the mirror MR.

Referring FIG. 4A and FIG. 4B, in this embodiment, the second sub-pixel SPR is defined not to be able to change the polarization direction of light when in the ON state, as shown in an optical path corresponding to the second sub-pixel SPR in FIG. 4A; the second sub-pixel SPR may change the polarization direction of light when in the OFF state, as shown in an optical path corresponding to the second sub-pixel SPR in FIG. 4B. In some embodiments, the second sub-pixel SPR is in the ON state when receiving voltage, and is in the OFF state when not receiving voltage, but the disclosure is not limited thereto. In other embodiments, the second sub-pixel SPR is in the ON state when not receiving voltage, and is in the OFF state when receiving voltage. Although FIG. 4A and FIG. 4B only show the optical path of the second sub-pixel SPR, it should be noted that the second sub-pixels SPR, SPG, and SPB all have similar optical paths when in the ON state, and the second sub-pixels SPR, SPG, and SPB all have similar optical paths when in the OFF state. In some embodiments, each of the second sub-pixels SPR, SPG, and SPB may be independently switched on and off. In other words, when red is required to be displayed, the second sub-pixel SPR is turned on and the second sub-pixels SPG and SPB are turned off. When green is required to be displayed, the second sub-pixel SPG is turned on and the second sub-pixels SPR and SPB are turned off. When blue is required to be displayed, the second sub-pixel SPB is turned on and the second sub-pixels SPR and SPG are turned off.

Referring FIG. 4A. when red is required to be displayed, the first sub-pixel R and the second sub-pixel SPR are enabled to switch to the ON state simultaneously, and when the stray light L (e.g. sunlight) from the external environment reaches the first sub-pixel R, the circularly polarized light or the elliptical polarized light in the first rotation direction SD1 is allowed to pass through, while the circularly polarized light or the elliptical polarized light in the second rotation direction SD2 is reflected. The circularly polarized light or the elliptical polarized light in the first rotation direction SD1 is converted by the first quarter-wave plate 250 into the linear polarized light in the first polarization direction PD1 after passing through the color filter 230 and the first substrate 210. The first polarization direction PD1 is substantially parallel to the first transmission axis TA1 of the first polarizer P1, so that the linear polarized light in the first polarization direction PD1 may pass through the first polarizer P1. In this embodiment, the linear polarized light in the first polarization direction PD1 passes through the second sub-pixel SPR, is then reflected by the mirror MR, and passes through the second sub-pixel SPR and the first polarizer P1 again. The linear polarized light in the first polarization direction PD1 passing through the first polarizer P1 is converted by the first quarter-wave plate 250 into the circularly polarized light or the elliptical polarized light in the first rotation direction SD1. The circularly polarized light or the elliptical polarized light in the first rotation direction SD1 may pass through the first sub-pixel R and be transmitted to the outside world.

Based on the above, the light recovery structure RS may effectively enhance the brightness of the cholesteric liquid crystal display 40.

Referring FIG. 4B, when red is not required to be displayed, the first sub-pixel R is enabled to switch to the second state (the cholesterol liquid crystal is enable to present focal conic state or homeotropic state) and the second sub-pixel SPR is enabled to switch to the Off state simultaneously, and the stray light L of the external environment passes through the first sub-pixel R, the color filter element 230, the first substrate 210, and the first quarter-wave plate 250 before being converted by the first polarizer P1 into the linear polarized light in the first polarization direction PD1. In this embodiment, the second sub-pixel SPR causes phase retardation of 1/4λ for the linear polarized light in the first polarization direction PD1, where λ is wavelength of the light, so that the linear polarized light in the first polarization direction PD1 is converted by the second sub-pixel SPR into the circularly polarized light or the elliptical polarized light in the first rotation direction SD1. The circularly polarized light or the elliptical polarized light in the first rotation direction SD1 is reflected by the mirror MR, and is converted into the circularly polarized light or the elliptical polarized light in the second rotation direction SD2 simultaneously. The circularly polarized light or the elliptical polarized light in the second rotation direction SD2 passes through the second sub-pixel SPR again, and is converted by the second sub-pixel SPR into the linear polarized light in the second polarization direction PD2. The second polarization direction PD2 is substantially perpendicular to the first transmission axis TA1 of the first polarizer P1, so that the linear polarized light in the second polarization direction PD2 is absorbed by the first polarizer P1.

In addition, when green is required to be displayed, the first sub-pixel G is enabled to switch to the first state and the second sub-pixel SPG is enabled to switch to the ON state simultaneously. When blue is required to be displayed, the first sub-pixel B is enabled to switch to the first state and the second sub-pixel SPB is enabled to switch to the ON state simultaneously. When green is not required to be displayed, the first sub-pixel G is enabled to switch to the second state and the second sub-pixel SPG is enabled to switch to the OFF state simultaneously. When blue is not required to be displayed, the first sub-pixel B is enabled to switch to the second state and the second sub-pixel SPB is enabled to switch to the OFF state simultaneously.

In summary, the light recovery structure RS may improve the lack of contrast of the cholesterol liquid crystal display.

Figure 5A:
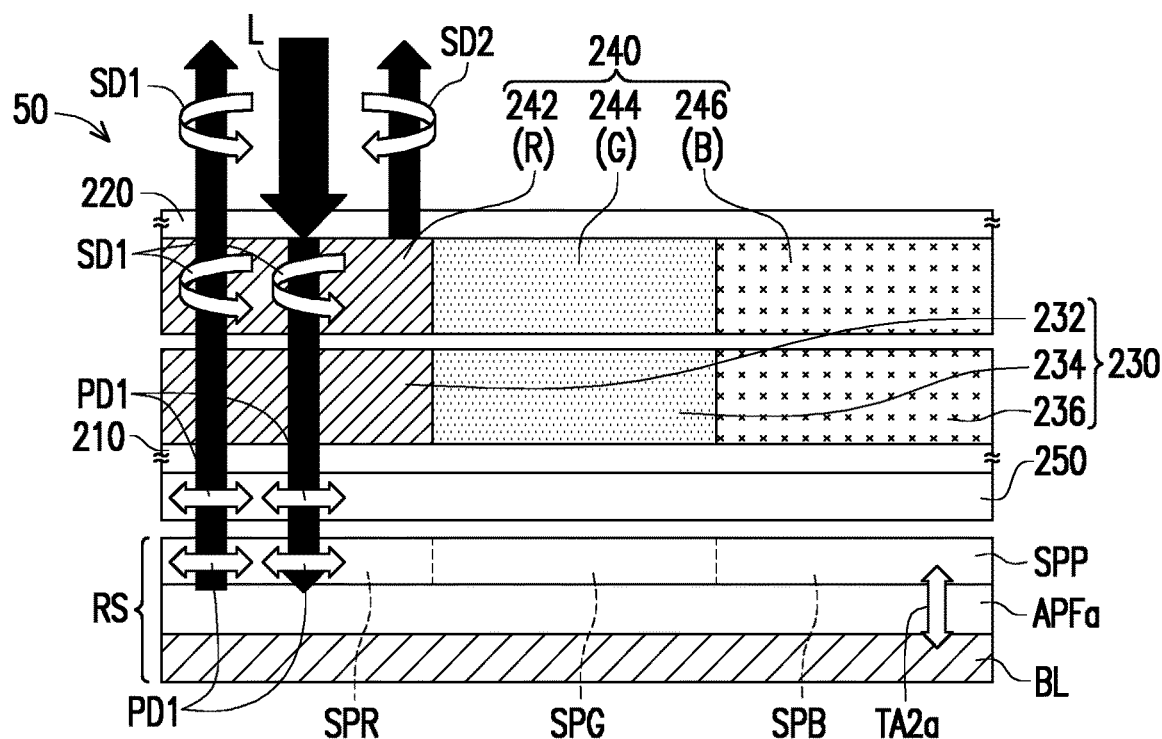
FIG. 5A is a schematic cross-sectional view of a cholesteric liquid crystal display in a display mode according to an embodiment of the disclosure.
Figure 5B:
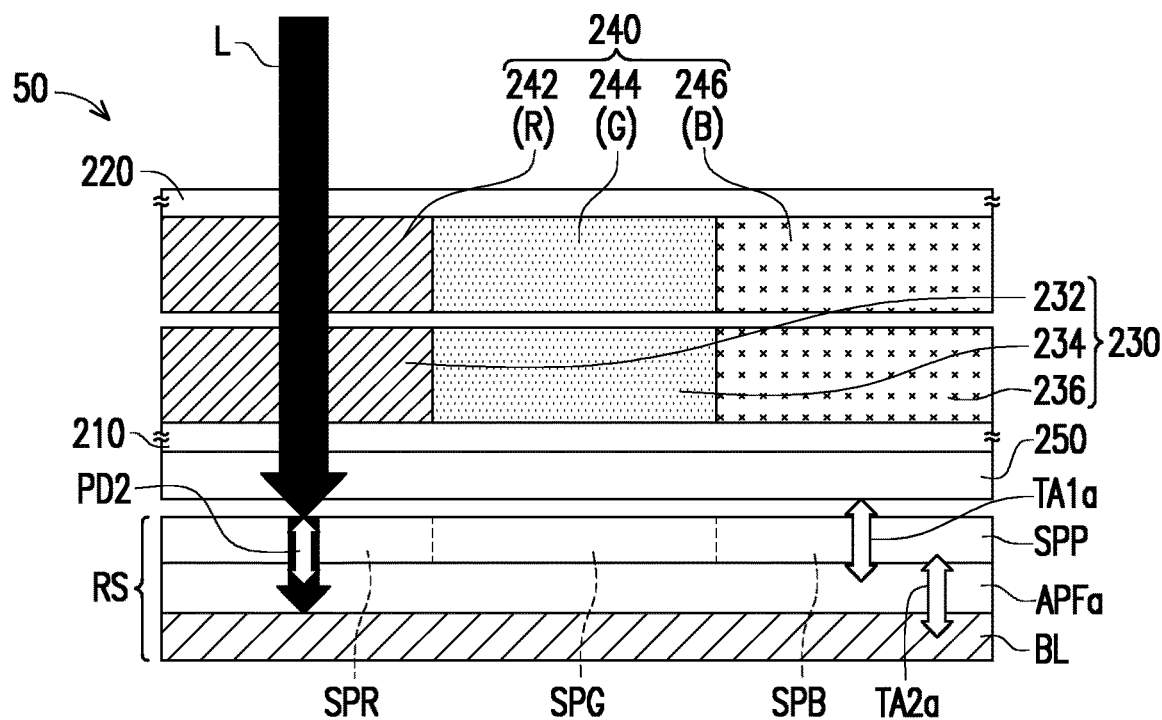
FIG. 5B is a schematic cross-sectional view of a cholesteric liquid crystal display in an off mode according to an embodiment of the disclosure.

FIG. 5A is a schematic cross-sectional view of a cholesteric liquid crystal display in display mode according to an embodiment of the disclosure. FIG. 5B is a schematic cross-sectional view of a cholesteric liquid crystal display in off mode according to an embodiment of the disclosure.

It should be noted that the embodiments of FIG. 5A and FIG. 5B follow the numeral references and parts of the embodiments of FIG. 2A and FIG. 2B, in which the same or similar numeral references are used to denote the same or similar elements, and the description of the same technical content is omitted. The description of the omitted parts can be found in the preceding embodiments and will not be repeated.

A cholesteric liquid crystal display 50 of FIG. 5A and FIG. 5B is similar to the cholesteric liquid crystal display 20 of FIG. 2A and FIG. 2B. The difference is that the light recovery structure RS of the cholesteric liquid crystal display 50 includes a switchable polarization panel SPP, the reflective polarizer APFa, and the light-absorbing substrate BL. The light-absorbing substrate BL overlaps the switchable polarization panel SPP. The reflective polarizer APFa is located between the light-absorbing substrate BL and the switchable polarization panel SPP.

In this embodiment, the switchable polarization panel SPP includes multiple second sub-pixels SPR, SPG, and SPB, and the second sub-pixels SPR, SPG, and SPB respectively overlap a corresponding one of the first sub-pixels R, G, and B.

The switchable polarization panel SPP is configured to allow the linear polarized light in the first polarization direction to pass through and to absorb the linear polarized light in the second polarization direction. In some embodiments, each of the second sub-pixels SPR, SPG, and SPB has a corresponding pixel electrode, and common electrodes of the second sub-pixels SPR, SPG, and SPB are electrically connected to each other. For example, the switchable polarization panel SPP has a similar structure to the liquid crystal panel LCP in FIG. 1D, but the difference is that a liquid crystal layer of the switchable polarization panel SPP may be switched between a polarizer mode (as shown in FIG. 5B) and a transparent mode (as shown in FIG. 5A) under the influence of electric field. In the polarizer mode, the second sub-pixels SPR, SPG and SPB are allow the linear polarized light in the first polarization direction PD1 in the stray light L to pass though, and absorb the linear polarized light in the second polarization direction simultaneously. The second polarization direction is substantially perpendicular to the first polarization direction PD1. In the transparent mode, the second sub-pixels SPR, SPG and SPB do not change the polarization direction of the light passing through.

Although FIG. 5A and FIG. 5B only show the optical path of the second sub-pixel SPR, it should be noted that the second sub-pixels SPR, SPG, and SPB all have similar optical paths when in the polarizer mode, and the second sub-pixels SPR, SPG, and SPB all have similar optical paths when in the transparent mode. In some embodiments, each of the second sub-pixels SPR, SPG, and SPB may be independently switched on and off. In other words, when red is required to be displayed, the second sub-pixel SPR is turned on and the second sub-pixels SPG and SPB are turned off. When green is required to be displayed, the second sub-pixel SPG is turned on and the second sub-pixels SPR and SPB are turned off. When blue is required to be displayed, the second sub-pixel SPB is turned on and the second sub-pixels SPR and SPG are turned off, and is not limited thereto. The switchable polarization panel SPP may be in the polarizer mode or the transparent mode when voltage is applied, depending on the liquid crystal type.

Referring FIG. 5A, when red is required to be displayed, the first sub-pixel R is enabled to switch to the first state and the second sub-pixel SPR is enabled to switch to the transparent mode. When the stray light L (e.g. sunlight) from the external environment reaches the first sub-pixel R, the circularly polarized light or the elliptical polarized light in the first rotation direction SD1 is allowed to pass through, while the circularly polarized light or the elliptical polarized light in the second rotation direction SD2 is reflected. The circularly polarized light or the elliptical polarized light in the first rotation direction SD1 is converted by the first quarter-wave plate 250 into the linear polarized light in the first polarization direction PD1 after passing through the color filter 230 and the first substrate 210. The linear polarized light in the first polarization direction PD1 passes through the second sub-pixel SPR in the transparent mode, and reaches the reflective polarizer APFa. The first polarization direction PD1 is substantially perpendicular to the second transmission axis TA2a of the reflective polarizer APFa, so that the linear polarized light in the first polarization direction PD1 is reflected by the reflective polarizer APFa and passes through the second sub-pixel SPR again. The linear polarized light in the first polarization direction PD1 passing through the second sub-pixel SPR is converted by the first quarter-wave plate 250 into the circularly polarized light or the elliptical polarized light in the first rotation direction SD1. The circularly polarized light or the elliptical polarized light in the first rotation direction SD1 may pass through the first sub-pixel R and be transmitted to the outside world.

Based on the above, the light recovery structure RS may effectively enhance the brightness of the cholesteric liquid crystal display 50.

Referring FIG. 5B, when red is not required to be displayed, the first sub-pixel R is enabled to switch to the second state, and the second sub-pixel SPR is enabled to switch to the polarizer mode. In the polarizer mode, the second sub-pixel SPR has a first transmission axis TA1a, in which the first transmission axis TA1a is substantially parallel to the second transmission axis TA2a of the reflective polarizer APFa. The stray light L of the external environment passes through the first sub-pixel R, the color filter element 230, the first substrate 210, and the first quarter-wave plate 250 before being converted by the second sub-pixel SPR into the linear polarized light in the second polarization direction PD2. The second polarization direction PD2 is substantially parallel to the second transmission axis TA2a of the reflective polarizer APFa, so that the linear polarized light in the second polarization direction PD2 is allowed to pass through the reflective polarizer APFa and is absorbed by the light-absorbing substrate BL.

In addition, when green is required to be displayed, the first sub-pixel G is enabled to switch to the first state and the second sub-pixel SPG is enabled to switch to the transparent mode. When blue is required to be displayed, the first sub-pixel B is enabled to switch to the first state and the second sub-pixel SPB is enabled to switch to the transparent mode. When green is not required to be displayed, the first sub-pixel G is enabled to switch to the second state and the second sub-pixel SPG is enabled to switch to the polarizer mode. When blue is not required to be displayed, the first sub-pixel B is enabled to switch to the second state and the second sub-pixel SPB is enabled to switch to the polarizer mode.

In summary, the light recovery structure RS may improve the lack of contrast of the cholesterol liquid crystal display.

Figure 6A:
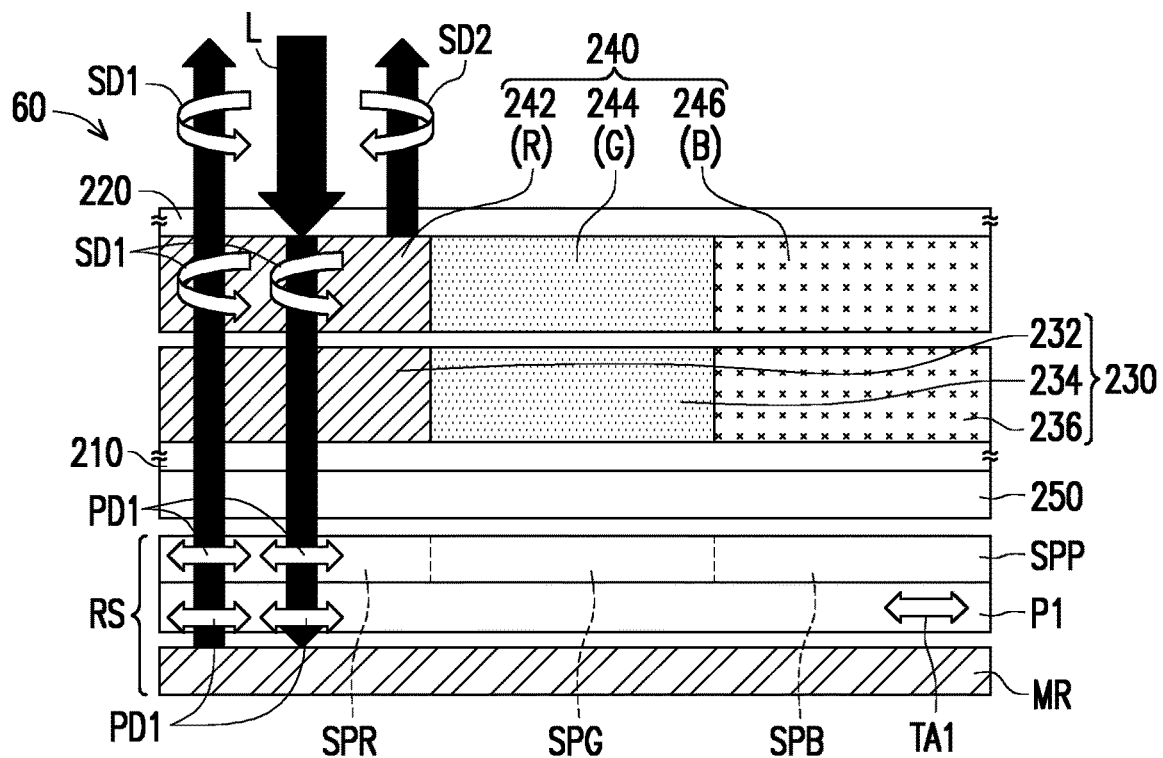
FIG. 6A is a schematic cross-sectional view of a cholesteric liquid crystal display in a display mode according to an embodiment of the disclosure.
Figure 6B:
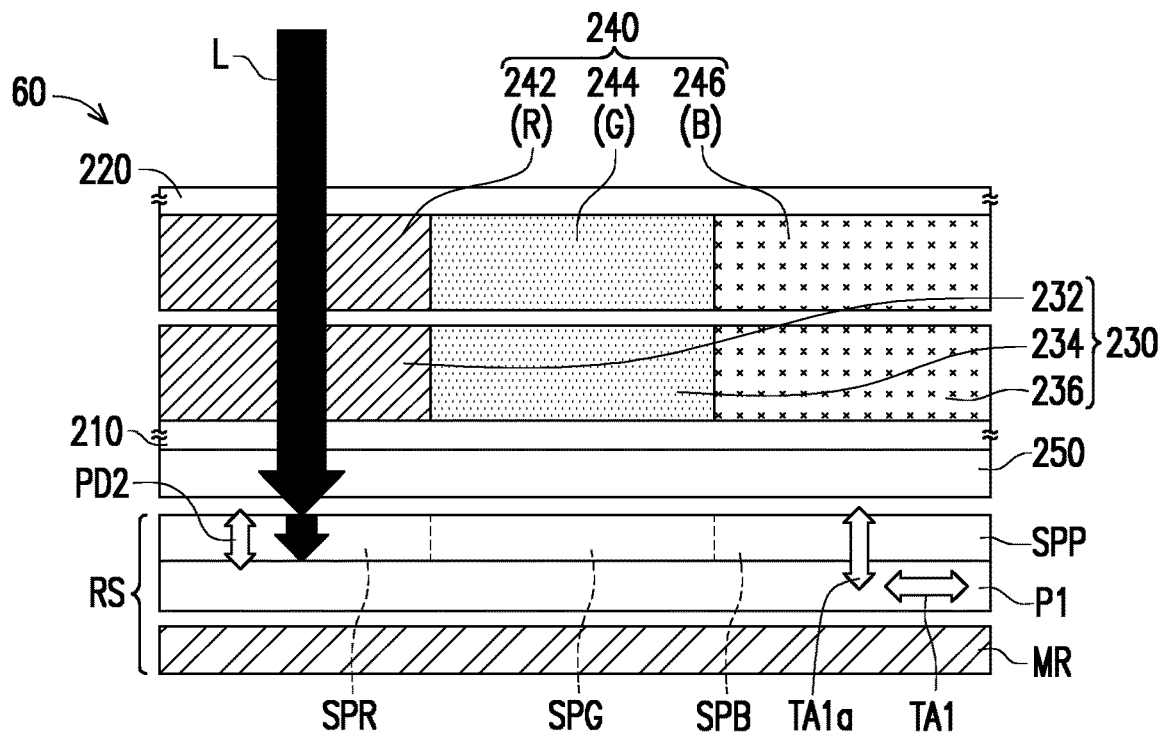
FIG. 6B is a schematic cross-sectional view of a cholesteric liquid crystal display in an off mode according to an embodiment of the disclosure.

FIG. 6A is a schematic cross-sectional view of a cholesteric liquid crystal display in display mode according to an embodiment of the disclosure. FIG. 6B is a schematic cross-sectional view of a cholesteric liquid crystal display in off mode according to an embodiment of the disclosure.

It should be noted that the embodiments of FIG. 6A and FIG. 6B follow the numeral references and parts of the embodiments of FIG. 5A and FIG. 5B, in which the same or similar numeral references are used to denote the same or similar elements, and the description of the same technical content is omitted. The description of the omitted parts can be found in the preceding embodiments and will not be repeated.

A cholesteric liquid crystal display 60 of FIG. 6A and FIG. 6B is similar to the cholesteric liquid crystal display 50 of FIG. 5A and FIG. 5B. The difference is that the light recovery structure RS of the cholesteric liquid crystal display 60 includes the switchable polarization panel SPP, the first polarizer P1, and the mirror MR. The mirror MR overlaps the switchable polarization panel SPP. The first polarizer P1 is located between the switchable polarization panel SPP and the mirror MR.

Referring FIG. 6A, when red is required to be displayed, the first sub-pixel R is enabled to switch to the first state and the second sub-pixel SPR is enabled to switch to the transparent mode. When the stray light L (e.g. sunlight) from the external environment reaches the first sub-pixel R, the circularly polarized light or the elliptical polarized light in the first rotation direction SD1 is allowed to pass through, while the circularly polarized light or the elliptical polarized light in the second rotation direction SD2 is reflected. The circularly polarized light or the elliptical polarized light in the first rotation direction SD1 is converted by the first quarter-wave plate 250 into the linear polarized light in the first polarization direction PD1. The linear polarized light in the first polarization direction PD1 passes through the second sub-pixel SPR in the transparent mode, the color filter element 230, and the first substrate 210, and reaches the first polarizer P1. The first polarization direction PD1 is substantially perpendicular to the first transmission axis TA1 of the first polarizer P1, so that the linear polarized light in the first polarization direction PD1 is allowed to pass through the first polarizer P1 and then is reflected by the mirror MR. The linear polarized light in the first polarization direction PD1 reflected by the mirror MR passes through the second sub-pixel SPR again, and then is converted by the first quarter-wave plate 250 into the circularly polarized light or the elliptical polarized light in the first rotation direction SD1. The circularly polarized light or the elliptical polarized light in the first rotation direction SD1 may pass through the first sub-pixel R and be transmitted to the outside world.

Based on the above, the light recovery structure RS may effectively enhance the brightness of the cholesteric liquid crystal display 60.

Referring FIG. 6B, when red is not required to be displayed, the first sub-pixel R is enabled to switch to the second state, and the second sub-pixel SPR is enabled to switch to the polarizer mode. In the polarizer mode, the second sub-pixel SPR has the first transmission axis TA1a, in which the first transmission axis TA1a is substantially parallel to the first transmission axis TA1a of the first polarizer P1. The stray light L of the external environment passes through the first sub-pixel R, the color filter element 230, the first substrate 210, and the first quarter-wave plate 250 before being converted by the second sub-pixel SPR into the linear polarized light in the second polarization direction PD2. The second polarization direction PD2 is substantially perpendicular to the first transmission axis TA1 of the first polarizer P1, so that the linear polarized light in the second polarization direction PD2 is absorbed by the first polarizer P1.

In addition, when green is required to be displayed, the first sub-pixel G is enabled to switch to the first state and the second sub-pixel SPG is enabled to switch to the transparent mode. When blue is required to be displayed, the first sub-pixel B is enabled to switch to the first state and the second sub-pixel SPB is enabled to switch to the transparent mode. When green is not required to be displayed, the first sub-pixel G is enabled to switch to the second state and the second sub-pixel SPG is enabled to switch to the polarizer mode. When blue is not required to be displayed, the first sub-pixel B is enabled to switch to the second state and the second sub-pixel SPB is enabled to switch to the polarizer mode.

In summary, the light recovery structure RS may improve the lack of contrast of the cholesterol liquid crystal display.

Figure 7A:
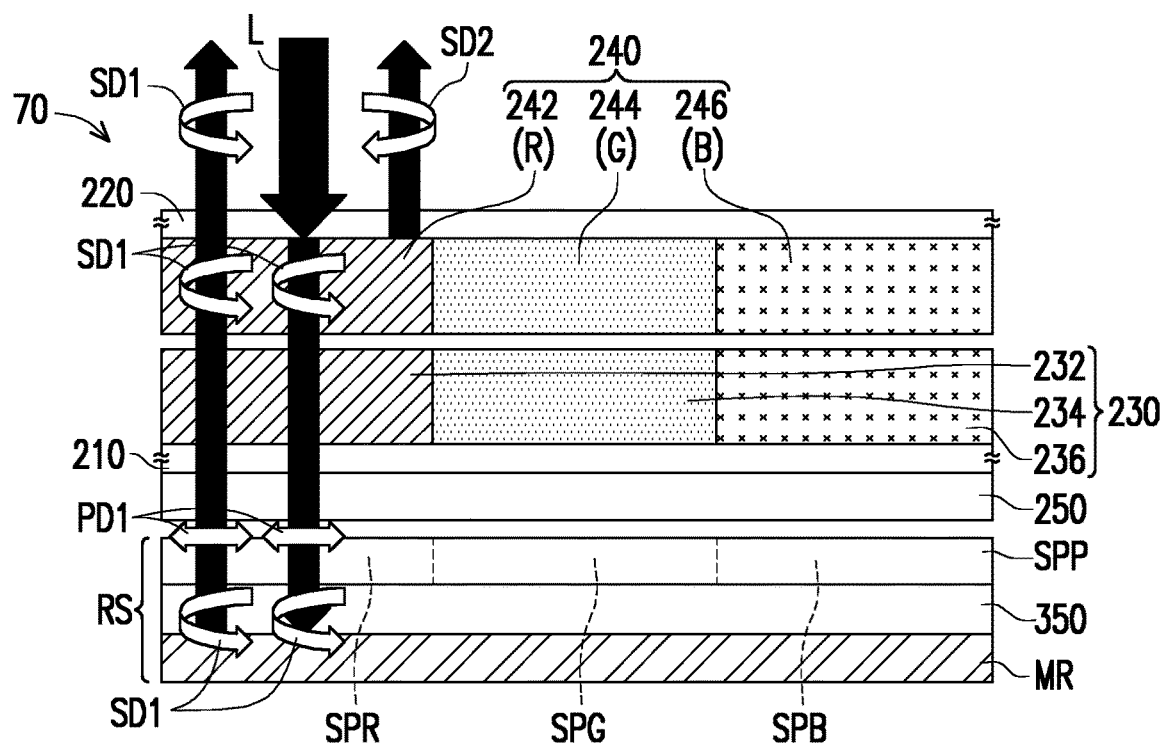
FIG. 7A is a schematic cross-sectional view of a cholesteric liquid crystal display in a display mode according to an embodiment of the disclosure.
Figure 7B:
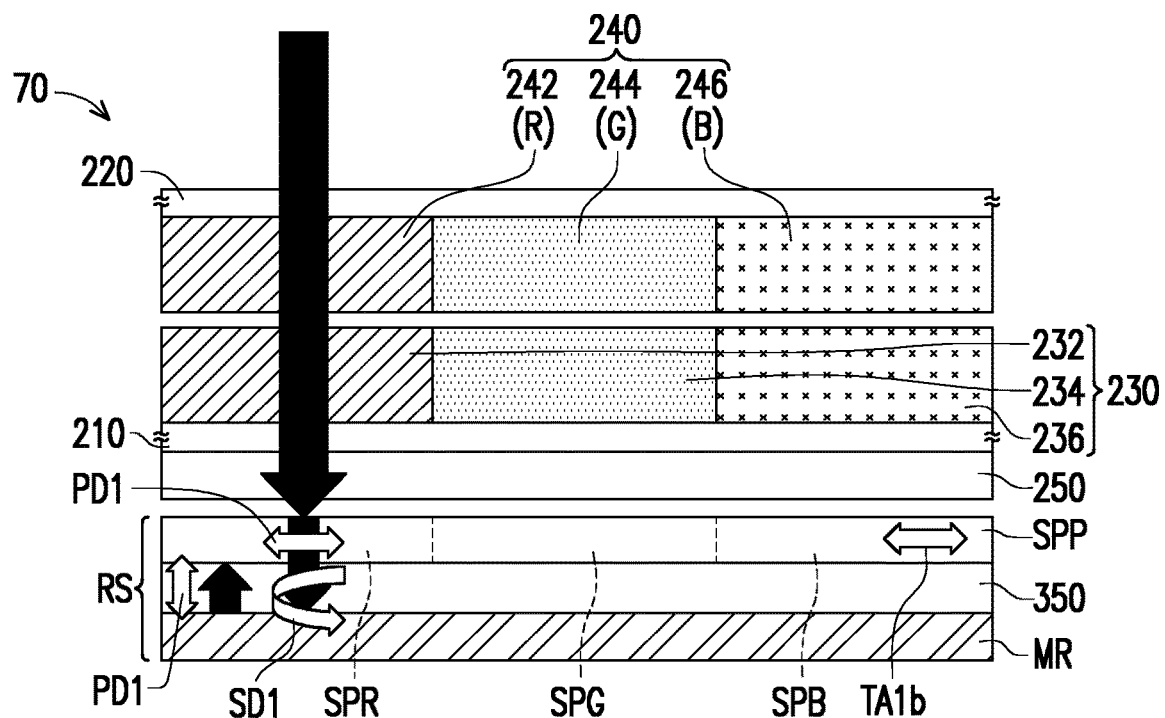
FIG. 7B is a schematic cross-sectional view of a cholesteric liquid crystal display in an off mode according to an embodiment of the disclosure.

FIG. 7A is a schematic cross-sectional view of a cholesteric liquid crystal display in display mode according to an embodiment of the disclosure. FIG. 7B is a schematic cross-sectional view of a cholesteric liquid crystal display in off mode according to an embodiment of the disclosure.

It should be noted that the embodiments of FIG. 7A and FIG. 7B follow the numeral references and parts of the embodiments of FIG. 6A and FIG. 6B, in which the same or similar numeral references are used to denote the same or similar elements, and the description of the same technical content is omitted. The description of the omitted parts can be found in the preceding embodiments and will not be repeated.

A cholesteric liquid crystal display 70 of FIG. 7A and FIG. 7B is similar to the cholesteric liquid crystal display 60 of FIG. 6A and FIG. 6B. The difference is that the light recovery structure RS of the cholesteric liquid crystal display 70 includes the switchable polarization panel SPP, a second quarter-wave plate 350, and the mirror MR. The mirror MR overlaps the switchable polarization panel SPP. The second quarter-wave plate 350 is located between the switchable polarization panel SPP and the mirror MR.

Referring FIG. 7A, when red is required to be displayed, the first sub-pixel R is enabled to switch to the first state and the second sub-pixel SPR is enabled to switch to the transparent mode. When the stray light L (e.g. sunlight) from the external environment reaches the first sub-pixel R, the circularly polarized light or the elliptical polarized light in the first rotation direction SD1 is allowed to pass through, while the circularly polarized light or the elliptical polarized light in the second rotation direction SD2 is reflected. The circularly polarized light or the elliptical polarized light in the first rotation direction SD1 is converted by the first quarter-wave plate 250 into the linear polarized light in the first polarization direction PD1 after passing through the color filter element 230 and the first substrate 210. The linear polarized light in the first polarization direction PD1 passes through the second sub-pixel SPR in the transparent mode, the color filter element 230, and the first substrate 210, and reaches the second quarter-wave plate 350. The linear polarized light in the first polarization direction PD1 is converted by the second quarter-wave plate 350 into the circularly polarized light or the elliptical polarized light in the first rotation direction SD1, and then is reflected by the mirror MR. The circularly polarized light or the elliptical polarized light in the first rotation direction SD1 is reflected by the mirror MR and passes through the second quarter-wave plate 350 again, and therefore, is converted into the linear polarized light in the first polarization direction PD1. The linear polarized light in the first polarization direction PD1 passes through the second sub-pixel SPR again, and then is converted by the first quarter-wave plate 250 into the circularly polarized light or the elliptical polarized light in the first rotation direction SD1. The circularly polarized light or the elliptical polarized light in the first rotation direction SD1 may pass through the first sub-pixel R and be transmitted to the outside world.

Based on the above, the light recovery structure RS may effectively enhance the brightness of the cholesteric liquid crystal display 70.

Referring FIG. 7B, when red is not required to be displayed, the first sub-pixel R is enabled to switch to the second state, and the second sub-pixel SPR is enabled to switch to the polarizer mode. In the polarizer mode, the second sub-pixel SPR has a first transmission axis TA1$b$. The stray light L of the external environment passes through the first sub-pixel R and the first quarter-wave plate 250 before being converted by the second sub-pixel SPR into the linear polarized light in the first polarization direction PD1. The linear polarized light in the first polarization direction PD1 is converted by the second quarter-wave plate 350 into the circularly polarized light or the elliptical polarized light in the first rotation direction SD1, and then is reflected by the mirror MR and re-passes through the second quarter-wave plate 350, and is therefore converted into the linear polarized light in the second polarization direction PD2. The second polarization direction PD2 is substantially perpendicular to the first transmission axis TA1$b$ of the second sub-pixel SPR, so the linear polarized light in the second polarization direction PD2 is absorbed by the second sub-pixel SPR.

In addition, when green is required to be displayed, the first sub-pixel G is enabled to switch to the first state and the second sub-pixel SPG is enabled to switch to the transparent mode. When blue is required to be displayed, the first sub-pixel B is enabled to switch to the first state and the second sub-pixel SPB is enabled to switch to the transparent mode. When green is not required to be displayed, the first sub-pixel G is enabled to switch to the second state and the second sub-pixel SPG is enabled to switch to the polarizer mode. When blue is not required to be displayed, the first sub-pixel B is enabled to switch to the second state and the second sub-pixel SPB is enabled to switch to the polarizer mode.

Figure 8:
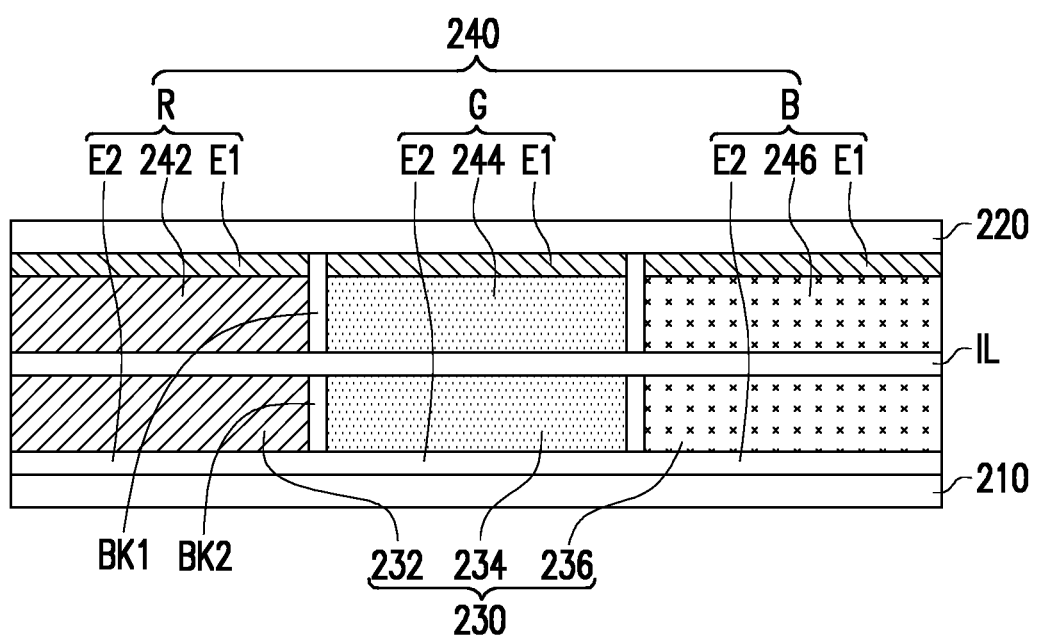
FIG. 8 is a schematic cross-sectional view of a cholesteric liquid crystal device according to an embodiment of the disclosure.

FIG. 8 is a schematic cross-sectional view of a cholesteric liquid crystal device according to an embodiment of the disclosure. It should be noted that the embodiment of FIG. 8 follows the numeral references and part of the embodiment of FIG. 1D, in which the same or similar numeral references are used to denote the same or similar elements, and the description of the same technical content is omitted. The description of the omitted parts can be found in the preceding embodiments and will not be repeated. The cholesteric liquid crystal device 240 of FIG. 8 may replace the cholesteric liquid crystal device 240 of any of the preceding embodiments.

Referring to FIG. 8, each of the first sub-pixels includes a control electrode, a cholesteric liquid crystal, and a common electrode. The common electrodes of the first sub-pixels are electrically connected to each other.

In this embodiment, the first sub-pixel R includes a control electrode E1, a cholesteric liquid crystal 242, and a common electrode E2. The first sub-pixel G includes a control electrode E1, a cholesteric liquid crystal 244, and a common electrode E2. The first sub-pixel B includes a control electrode E1 and a cholesteric liquid crystal 246. The common electrodes E2 of the first sub-pixels R, G, and B are electrically connected to each other. The cholesteric liquid crystals 242, 244, and 246 are located between the control electrodes E1 and the common electrodes E2. The control electrodes E1 are located between the second substrate 220 and the cholesteric liquid crystals 242, 244, and 246. The common electrodes E2 are located between the color filter element 230 and the first substrate 210. In this embodiment, a buffer layer IL is also included between the color filter element 230 and the cholesteric liquid crystal device 240.

In some embodiments, multiple active elements (not shown) are also located between the first substrate 210 and the second substrate 220, and the active elements are configured to control voltage of the control electrodes E1 and/or the common electrodes E2.

In summary, the embodiments of the disclosure may improve the lack of contrast of the cholesterol liquid crystal display.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A cholesteric liquid crystal display comprising:
   a cholesteric liquid crystal device comprising a plurality of first sub-pixels, wherein each of the first sub-pixels comprises a control electrode, a cholesteric liquid crystal, and a common electrode, wherein the common electrodes of the first sub-pixels are electrically connected to each other;
   a color filter element and a first quarter-wave plate overlapping the cholesteric liquid crystal device;
   a light recovery structure, wherein the first quarter-wave plate and the color filter element are located between the cholesteric liquid crystal and the light recovery structure; and
   a first substrate and a second substrate, wherein the color filter element and the cholesteric liquid crystal device are located between the first substrate and the second substrate, wherein the control electrodes are located between the second substrate and the cholesteric liquid crystals, and the common electrodes are located between the color filter element and the first substrate or between the color filter element and the cholesteric liquid crystals.

2. The cholesteric liquid crystal display according to claim 1, wherein the first sub-pixels comprise:
   a red sub-pixel comprising a red cholesteric liquid crystal;
   a green sub-pixel comprising a green cholesteric liquid crystal; and
   a blue sub-pixel comprising a blue cholesteric liquid crystal; and
   the color filter element comprises:
   a red filter element overlapping the red sub-pixel;
   a green filter element overlapping the green sub-pixel; and
   a blue filter element overlapping the blue sub-pixel.

3. The cholesteric liquid crystal display according to claim 1, wherein the light recovery structure comprises a liquid crystal panel, wherein the liquid crystal panel comprises a liquid crystal layer suitable for generating light with phase retardation of integer multiples of $1/2\lambda$ or $1/4\lambda$.

4. The cholesteric liquid crystal display according to claim 3, wherein the liquid crystal panel comprises a plurality of second sub-pixels, wherein the second sub-pixels respectively overlap a corresponding one of the first sub-pixels.

5. The cholesteric liquid crystal display according to claim 3, wherein the light recovery structure further comprises:
   a first polarizer located between the liquid crystal panel and the first quarter-wave plate;
   a light-absorbing substrate overlapping the liquid crystal panel; and
   a reflective polarizer located between the light-absorbing substrate and the liquid crystal panel, wherein a transmission axis of the first polarizer is substantially parallel to a transmission axis of the reflective polarizer.

6. The cholesteric liquid crystal display according to claim 3, wherein the light recovery structure further comprises:
   a first polarizer located between the liquid crystal panel and the first quarter-wave plate; and
   a mirror overlapping the liquid crystal panel.

7. The cholesteric liquid crystal display according to claim 6, wherein the light recovery structure further comprises:
   a second polarizer located between the mirror and the liquid crystal panel, and a transmission axis of the second polarizer is substantially perpendicular to a transmission axis of the first polarizer.

8. The cholesteric liquid crystal display according to claim 1, wherein the light recovery structure comprises a switchable polarization panel configured to allow linear polarized light in a first polarization direction to pass through and to absorb linear polarized light in a second polarization direction.

9. The cholesteric liquid crystal display according to claim 8, wherein the switchable polarization panel comprises a plurality of second sub-pixels, wherein the second sub-pixels respectively overlap a corresponding one of the first sub-pixels.

10. The cholesteric liquid crystal display according to claim 8, wherein the light recovery structure further comprises:
    a light-absorbing substrate overlapping the switchable polarization panel; and
    a reflective polarizer located between the light-absorbing substrate and the switchable polarization panel.

11. The cholesteric liquid crystal display according to claim 8, wherein the light recovery structure further comprises:
    a mirror overlapping the switchable polarization panel; and
    a first polarizer located between the switchable polarization panel and the mirror.

12. The cholesteric liquid crystal display according to claim 8, wherein the light recovery structure further comprises:
    a mirror overlapping the switchable polarization panel; and
    a second quarter-wave plate located between the switchable polarization panel and the mirror.

13. A cholesteric liquid crystal display comprising:
    a cholesteric liquid crystal device comprising a plurality of first sub-pixels, and each of the first sub-pixels comprises a cholesteric liquid crystal;
    a color filter element and a first quarter-wave plate overlapping the cholesteric liquid crystal device; and
    a light recovery structure, wherein the first quarter-wave plate and the color filter element are located between the cholesteric liquid crystal and the light recovery structure, wherein the light recovery structure comprises a liquid crystal panel, wherein the liquid crystal panel comprises a liquid crystal layer suitable for generating light with phase retardation of integer multiples of $1/2\lambda$ or $1/4\lambda$.

14. The cholesteric liquid crystal display according to claim 13, wherein the liquid crystal panel comprises a plurality of second sub-pixels, wherein the second sub-pixels respectively overlap a corresponding one of the first sub-pixels.

15. The cholesteric liquid crystal display according to claim 13, wherein the light recovery structure further comprises:
a first polarizer located between the liquid crystal panel and the first quarter-wave plate;
a light-absorbing substrate overlapping the liquid crystal panel; and
a reflective polarizer located between the light-absorbing substrate and the liquid crystal panel, wherein a transmission axis of the first polarizer is substantially parallel to a transmission axis of the reflective polarizer.

16. The cholesteric liquid crystal display according to claim 13, wherein the light recovery structure further comprises:
a first polarizer located between the liquid crystal panel and the first quarter-wave plate; and
a mirror overlapping the liquid crystal panel.

17. The cholesteric liquid crystal display according to claim 16, wherein the light recovery structure further comprises:
a second polarizer located between the mirror and the liquid crystal panel, and a transmission axis of the second polarizer is substantially perpendicular to a transmission axis of the first polarizer.

18. A cholesteric liquid crystal display comprising:
a cholesteric liquid crystal device comprising a plurality of first sub-pixels, and each of the first sub-pixels comprises a cholesteric liquid crystal;
a color filter element and a first quarter-wave plate overlapping the cholesteric liquid crystal device; and
a light recovery structure, wherein the first quarter-wave plate and the color filter element are located between the cholesteric liquid crystal and the light recovery structure, wherein the light recovery structure comprises a switchable polarization panel configured to allow linear polarized light in a first polarization direction to pass through and to absorb linear polarized light in a second polarization direction.

19. The cholesteric liquid crystal display according to claim 18, wherein the switchable polarization panel comprises a plurality of second sub-pixels, wherein the second sub-pixels respectively overlap a corresponding one of the first sub-pixels.

20. The cholesteric liquid crystal display according to claim 18, wherein the light recovery structure further comprises:
a light-absorbing substrate overlapping the switchable polarization panel; and
a reflective polarizer located between the light-absorbing substrate and the switchable polarization panel.

21. The cholesteric liquid crystal display according to claim 18, wherein the light recovery structure further comprises:
a mirror overlapping the switchable polarization panel; and
a first polarizer located between the switchable polarization panel and the mirror.

22. The cholesteric liquid crystal display according to claim 18, wherein the light recovery structure further comprises:
a mirror overlapping the switchable polarization panel; and
a second quarter-wave plate located between the switchable polarization panel and the mirror.

* * * * *